United States Patent
Ogawa

(10) Patent No.: US 11,176,840 B2
(45) Date of Patent: Nov. 16, 2021

(54) SERVER, COMMUNICATION TERMINAL, INFORMATION PROCESSING SYSTEM, INFORMATION PROCESSING METHOD AND RECORDING MEDIUM

(71) Applicant: CASIO COMPUTER CO., LTD., Tokyo (JP)

(72) Inventor: Kentaro Ogawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 290 days.

(21) Appl. No.: 16/230,685

(22) Filed: Dec. 21, 2018

(65) Prior Publication Data

US 2019/0197910 A1    Jun. 27, 2019

(30) Foreign Application Priority Data

Dec. 25, 2017   (JP) .............................. JP2017-247506

(51) Int. Cl.
*G09B 5/00*      (2006.01)
*G09B 5/12*      (2006.01)
(Continued)

(52) U.S. Cl.
CPC ............... *G09B 5/125* (2013.01); *G09B 5/06* (2013.01); *G09B 19/06* (2013.01)

(58) Field of Classification Search
CPC . G09B 5/08; G09B 5/12; G09B 5/125; G09B 7/00; G09B 7/07; G09B 7/077; G09B 19/06

See application file for complete search history.

(56) References Cited

U.S. PATENT DOCUMENTS 6,704,541 B1 *   3/2004   Ciarallo ................... G09B 5/00
                                                       434/350
8,554,640 B1 *  10/2013   Dykstra ............... G06Q 10/101
                                                       705/26.7
(Continued)

FOREIGN PATENT DOCUMENTS

JP       2003162209 A      6/2003
JP       2004192523 A      7/2004

OTHER PUBLICATIONS

The "EX-word DATAPLUS10 Electronic dictionary User's guide XD-G4800 XD-G4900" (produced by CASIO Computer Co., Ltd.), which is published on the internet (http://support.casio.jp/storage/pdf/003/XD-G4800_WA_JA.pdf.

*Primary Examiner* — Peter R Egloff
(74) *Attorney, Agent, or Firm* — Holtz, Holtz & Volek PC

(57) ABSTRACT

A server includes: a processor, a transmitter/receiver to communicate with a communication terminal and a plurality of other communication terminals, and a storage storing instructions. The processor executes the instructions to: select at least one first user among the plurality of other users based on a viewing state indicating extent of viewing of content by a user, which is stored in a storage of the communication terminal, and a plurality of other viewing states by each of a plurality of other users, each indicating extent of viewing of the content, which is stored in a storage of each of the plurality of other communication terminals; and control the transmitter/receiver of the server to output information indicating at least one first other viewing state corresponding to the selected at least one first user among the plurality of other viewing states.

13 Claims, 13 Drawing Sheets

(51) Int. Cl.
*G09B 19/06* (2006.01)
*G09B 5/06* (2006.01)

(56) References Cited

U.S. PATENT DOCUMENTS

| | | | | |
|---|---|---|---|---|
| 8,793,575 | B1* | 7/2014 | Lattyak | G06F 40/169 |
| | | | | 715/273 |
| 2008/0254430 | A1* | 10/2008 | Woolf | G09B 5/00 |
| | | | | 434/322 |
| 2014/0164593 | A1* | 6/2014 | Murray | H04L 65/4015 |
| | | | | 709/224 |
| 2014/0335497 | A1* | 11/2014 | Gal | G09B 5/08 |
| | | | | 434/323 |
| 2016/0335902 | A1* | 11/2016 | Yang | G09B 7/02 |
| 2017/0301252 | A1* | 10/2017 | Wu | G06Q 30/0261 |

* cited by examiner

VIEWED INFORMATION 272

| LEARNER'S CONTENT | CATEGORY | DEGREE OF PROGRESS | FREQUENCY OF VIEWING |
|---|---|---|---|
| CONTENT A | VOCABULARY | 30% | 5 TIMES/ MONTH |
| CONTENT B | VOCABULARY | 10% | 2 TIMES/ MONTH |
| CONTENT C | CONVERSATION | 100% | 10 TIMES/ MONTH |
| CONTENT D | PRONUNCIATION | 0% | 0 TIMES/ MONTH |
| ⋮ | | | |

FIG. 10

VIEWED DATABASE                                                                  420

| | USER ID | NICK-NAME | DEGREE OF PROGRESS(%)/ FREQUENCY OF VIEWING(TIMES/MONTH) | | | |
|---|---|---|---|---|---|---|
| | | | CONTENT A | CONTENT B | CONTENT C | ... |
| USER A | 1 | AAA | 30% 5 TIMES/ MONTH | 10% 2 TIMES/ MONTH | 100% 10 TIMES/ MONTH | |
| USER B | 2 | BBB | 0% 0 TIMES/ MONTH | 30% 6 TIMES/ MONTH | 15% 2 TIMES/ MONTH | ... |
| USER C | 3 | CCC | 20% 3 TIMES/ MONTH | 0% 0 TIMES/ MONTH | 40% 2 TIMES/ MONTH | |
| USER D | 4 | DDD | 80% 7 TIMES/ MONTH | 0% 0 TIMES/ MONTH | 0% 0 TIMES/ MONTH | |

RIVAL DATABASE (TARGET:CONTENT A)                                           440

| | STATUS | USER ID | NICK-NAME | OUTPUT NAME | DEGREE OF PROGRESS | CHANGE RATE |
|---|---|---|---|---|---|---|
| USER P | RIVAL 1 | 16 | PPP | PPP | 38% | 15% |
| USER Q | RIVAL 2 | 17 | QQQ | QQQ | 36% | 10% |
| USER A | YOU | 1 | AAA | AAA | 30% | 10% |
| USER R | RIVAL 3 | 18 | RRR | RRR | 28% | 5% |
| USER S | RIVAL 4 | 19 | SSS | SSS | 23% | 8% |

RIVAL DATABASE (TARGET:CONTENT A) — 440

|  | STATUS | USER ID | NICK-NAME | OUTPUT NAME | DEGREE OF PROGRESS | CHANGE RATE |
|---|---|---|---|---|---|---|
| USER P | RIVAL 1 | 16 | PPP | PPP | 53% | 15% |
| USER Q | RIVAL 2 | 17 | QQQ | QQQ | 46% | 10% |
| USER R | RIVAL 3 | 18 | RRR | RRR | 40% | 12% |
| USER A | YOU | 1 | AAA | AAA | 37% | 7% |
| USER S | RIVAL 4 | 19 | SSS | SSS | 28% | 5% |

RIVAL DATABASE (TARGET:CONTENT A)　　　　440

|  | STATUS | USER ID | NICK-NAME | OUTPUT NAME | DEGREE OF PROGRESS | CHANGE RATE |
|---|---|---|---|---|---|---|
| USER X | RIVAL 1 | 24 | XXX | PPP | 40% | 2% |
| USER Y | RIVAL 2 | 17 | YYY | QQQ | 39% | 3% |
| USER A | YOU | 1 | AAA | AAA | 37% | 7% |
| USER Z | RIVAL 3 | 25 | ZZZ | RRR | 33% | 3% |
| USER S | RIVAL 4 | 19 | SSS | SSS | 28% | 5% |

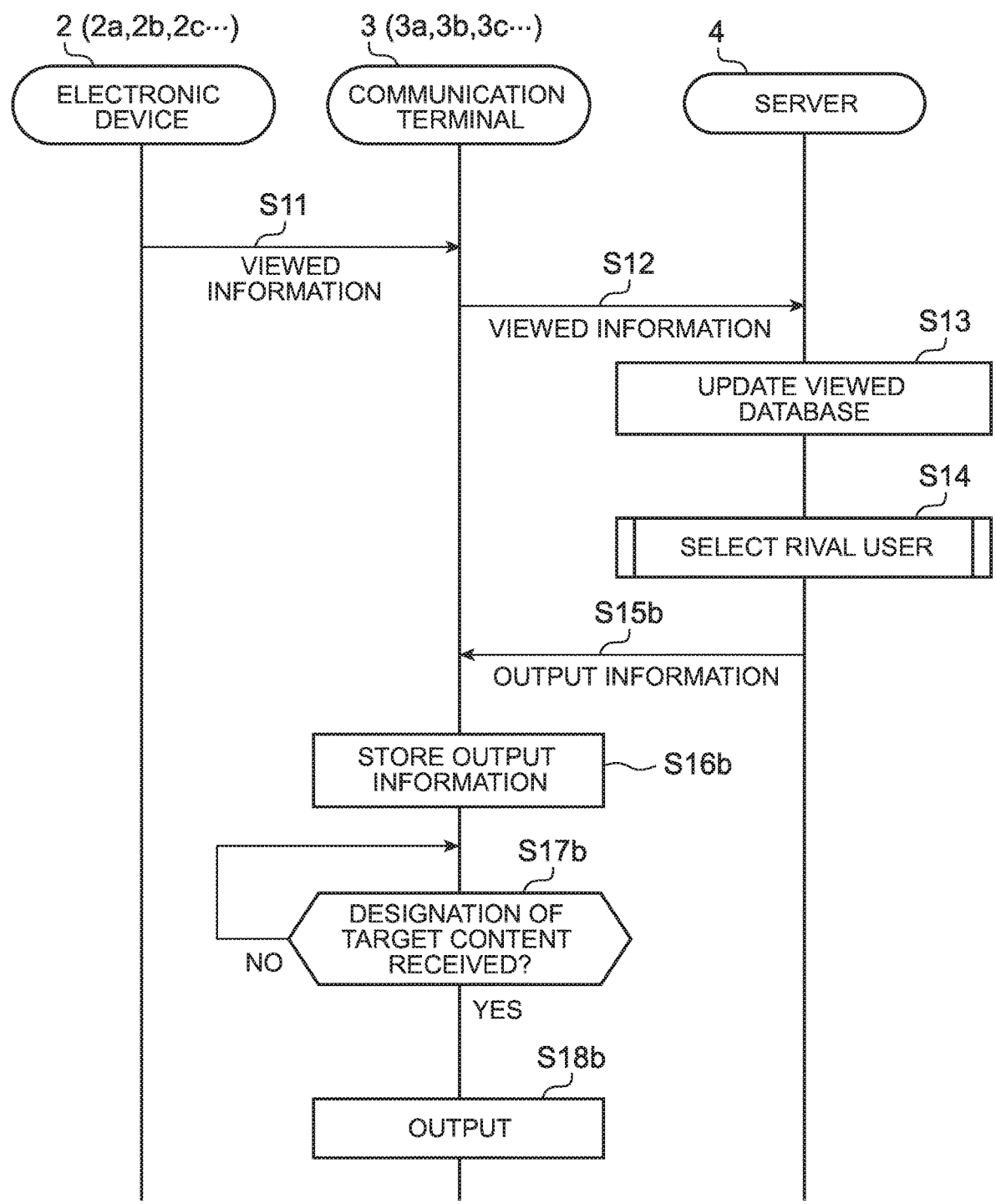

SERVER, COMMUNICATION TERMINAL, INFORMATION PROCESSING SYSTEM, INFORMATION PROCESSING METHOD AND RECORDING MEDIUM

CROSS-REFERENCE TO RELATED APPLICATIONS

This application is based upon and claims the benefit of priority of Japanese Patent Application No. 2017-247506 filed on Dec. 25, 2017, the entire disclosure of which is incorporated herein by reference in its entirety.

BACKGROUND OF THE INVENTION

1. Technical Field

The technical field relates to information processing systems, electronic devices, methods for processing information, and recording media.

2. Description of the Related Art

Techniques to allow a user to view content have been known. The "EX-word DATAPLUS10 Electronic dictionary User's guide XD-G4800 XD-G4900" (produced by CASIO Computer Co., Ltd.), which is published on the internet (http://support.casio.jp/storage/pdf/003/XD-G4800_WA_JA.pdf), (searched on 28 Aug. 2017) discloses an electronic dictionary allowing a user to view learner's content.

For such a technique of allowing a user to view the content, there is a demand to increase the motivation of a user to view the content.

BRIEF SUMMARY

A server of the present invention includes: a processor, a transmitter/receiver to communicate with a communication terminal and a plurality of other communication terminals, and a storage storing instructions, wherein the processor executes the instructions to: select at least one first user among the plurality of other users based on a viewing state indicating extent of viewing of content by a user, which is stored in a storage of the communication terminal, and a plurality of other viewing states by each of a plurality of other users, each indicating extent of viewing of the content, which is stored in a storage of each of the plurality of other communication terminals; and control the transmitter/receiver of the server to output information indicating at least one first other viewing state corresponding to the selected at least one first user among the plurality of other viewing states.

An information processing system of the present invention includes: a communication terminal having a processor, a transmitter/receiver to communicate with a server, a display, and a storage; a plurality of other communication terminals each having a processor, a transmitter/receiver to communicate with the server, a display, and a storage; and the server having a processor, a transmitter/receiver to communicate with the communication terminal and the other communication terminals, and a storage, wherein the communication terminal is configured to: transmit, to the server, information of viewing state indicating extent of viewing of content stored in the storage of the communication terminal; each of the plurality of the other communication terminals is configured to: transmit, to the server, information of each of other viewing states each indicating extent of viewing of the content stored in the storage of each of a plurality of the other communication terminals; the server is configured to: receive the information of the viewing state transmitted from the communication terminal, receive the information of each of the other viewing states transmitted from the each other communication terminals, based on the received information of the viewing state and the received information of the other viewing states, select at least one first user among the other users, and transmit, to the communication terminal, information of at least one first other viewing state corresponding to the selected at least one first user, among the other viewing states; and the communication terminal is configured further to: receive, from the server, the information of at least one first other viewing state corresponding to the selected at least one first user, and output, to a display of the communication terminal, the received information indicating the at least one first other viewing state corresponding to the selected at least one first user.

An information processing method of the present invention which is executed by a server having a processor, a transmitter/receiver to communicate with a communication terminal and a plurality of other communication terminals, and a storage, wherein the method includes: receiving, from the communication terminal, information of a viewing state indicating extent of viewing of content stored in a storage of the communication terminal; receiving, from the other communication terminals, the information of a plurality of other viewing states each indicating extent of viewing of the content stored in a storage of each of the plurality of other communication terminals; based on the received information of the viewing state and the received information of the plurality of other viewing states, select at least one first user among the plurality of other users; and output, by the transmitter/receiver of the server, information indicating at least one first other viewing state corresponding to the selected at least one first user, among the plurality of the other viewing states.

A non-volatile recording medium of the present invention having a program recorded thereon that is executable to control a computer to: based on a viewing state indicating extent of viewing of content, which is stored in a storage of a communication terminal, by a user and a plurality of other viewing states each indicating extent of viewing of the content, which is stored in a storage of each of a plurality of other communication terminals, by each of a plurality of other users, select at least one first user among the plurality of other users; and output information indicating at least one first other viewing state corresponding to the selected at least one first user, among the plurality of the other viewing states.

A communication terminal of the present invention includes: a processor; a transmitter/receiver to communicate with other communication terminals or a server; a display; and a storage, wherein the storage stores instructions and the processor executes the instructions to: execute content designated by a user so as to allow the user to view the content; acquire information of a viewing state indicating extent of viewing of content by the user; receive information of a plurality of other viewing states from other communication terminals or from a server configured to receive the information of the plurality of other viewing states from the other communication terminals; based on the information of the viewing state and the information of the other viewing states, select at least one first user among the other users; and output, to a display of the communication terminal, information of at least one first other viewing state corresponding to the selected at least one first user, among the other viewing states.

BRIEF DESCRIPTION OF THE DRAWINGS

The components in the drawings are not necessarily to scale relative to each other.

FIG. 10 shows one example of the viewed database stored in the server according to Embodiment 1.

FIG. 11 shows a first example of the rival database stored in the server according to Embodiment 1.

FIG. 20 shows a sequence for the processing flow executed by the information processing system of Embodiment 3 of the present invention.

DETAILED DESCRIPTION

Figure 1:
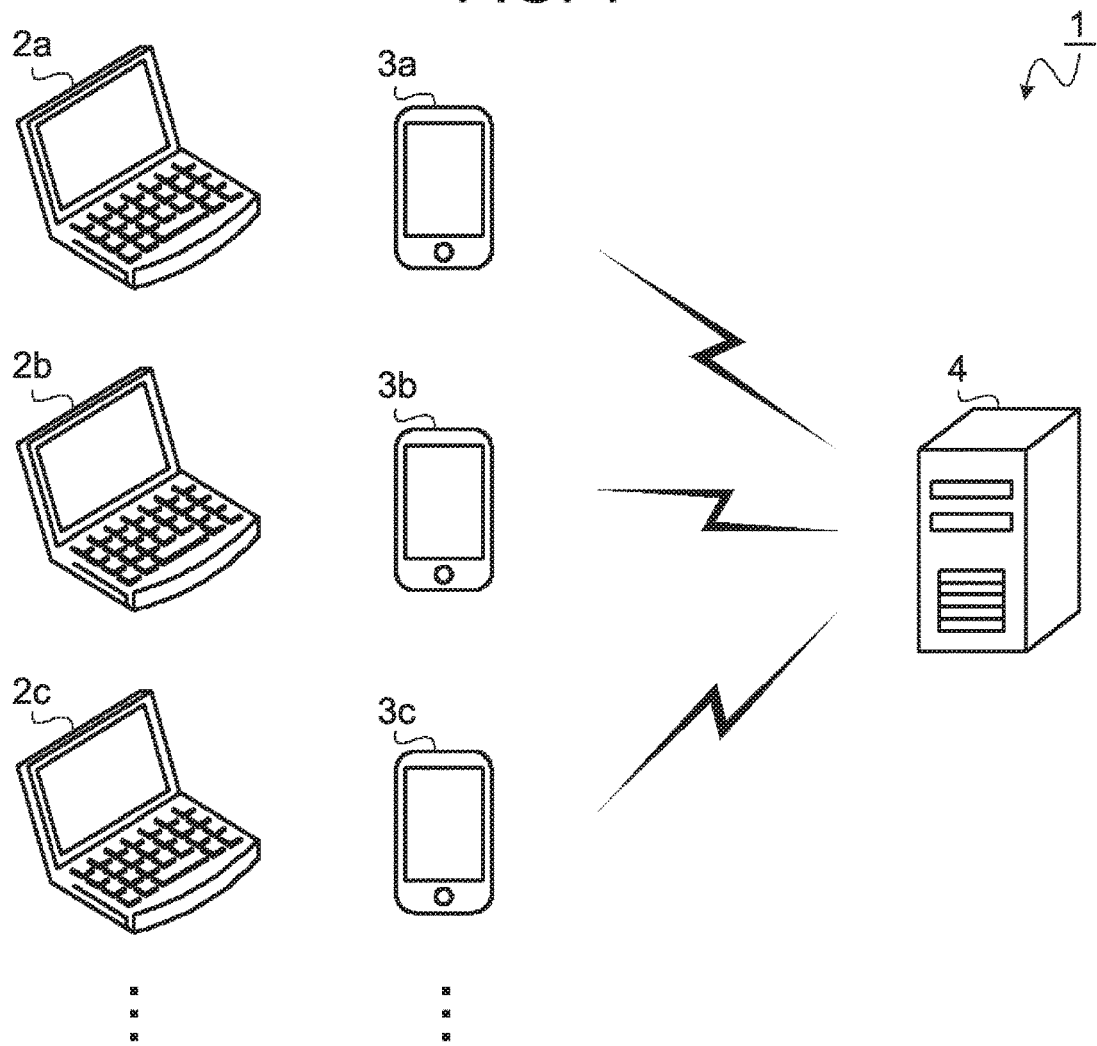
FIG. 1 shows the overall structure of an information processing system according to Embodiment 1 of the present invention.

The following describes some embodiments of the present invention, with reference to the drawings. Like reference numerals designate identical or corresponding components throughout the drawings.

Embodiment 1

FIG. 1 shows the overall structure of an information processing system 1 according to Embodiment 1 of the present invention. The information processing system 1 is a system to help a user with learning when the user learns with an electronic device 2 by viewing the learner's content. Specifically the system outputs the viewing state of the learner's content by other users to help the user with learning.

As shown in FIG. 1, the information processing system 1 includes a plurality of electronic devices 2a, 2b, 2c . . . , a plurality of communication terminals 3a, 3b, 3c . . . and a server 4, The plurality of communication terminals 3a, 3b, 3c . . . and the server 4 are communicably connected via a wide area network, such as the internet.

Figure 2:
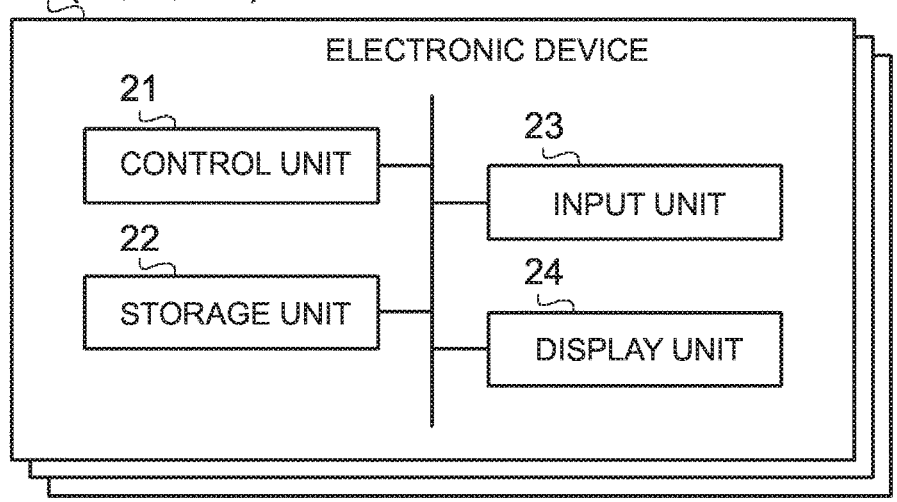
FIG. 2 is a block diagram of the hardware configuration of the electronic device according to Embodiment 1.

Each of the plurality of electronic devices 2a, 2b, 2c . . . is operated by a user. Each of the electronic devices 2a, 2b, 2c . . . is an electronic dictionary in one example, storing various types of content including learner's text and dictionaries. As shown in FIG. 2, each of the electronic devices 2a, 2b, 2c . . . includes a control unit 21, a storage unit 22, an input unit 23 and a display unit 24. The following collectively describes the plurality of electronic devices 2a, 2b, 2c . . . as an electronic device 2 when there is no need to make a distinction among them.

The control unit 21 includes a CPU (Central Processing Unit), a ROM (Read Only Memory) and a RAM (Random Access Memory). The CPU is a microprocessor, for example, which is a central processing unit to carry out various types of processing and calculations. In the control unit 21, the CPU reads a control program stored in the ROM, and controls the overall operation of the device (electronic device 2) while using the RAM as a work memory. The control unit 21 functions as a control means (device-side control means).

The storage unit 22 is a non-volatile memory, such as a flash memory or a hard disk. The storage unit 22 stores programs and data, including an OS (Operating System) and application programs, that the control unit 21 uses for various types of processing. The storage unit 22 also stores data that the control unit 21 creates or acquires during various types of processing.

The input unit 23 includes input devices, such as entry keys, buttons, switches, a touch pad, and a touch panel. The input unit 23 receives operations and instructions from a user and transmits the received operations and instructions to the control unit 21.

The display unit 24 includes a display device, such as a liquid crystal display or an organic EL (Electro Luminescence) display. The display unit 24 is driven by a display driving circuit not illustrated to display various images depending on the situation. Note here that the display unit 24 may be mutually overlapped with the input unit 23 so that the display unit 24 and the input unit 23 make up a touch panel (touch screen).

Figure 3:
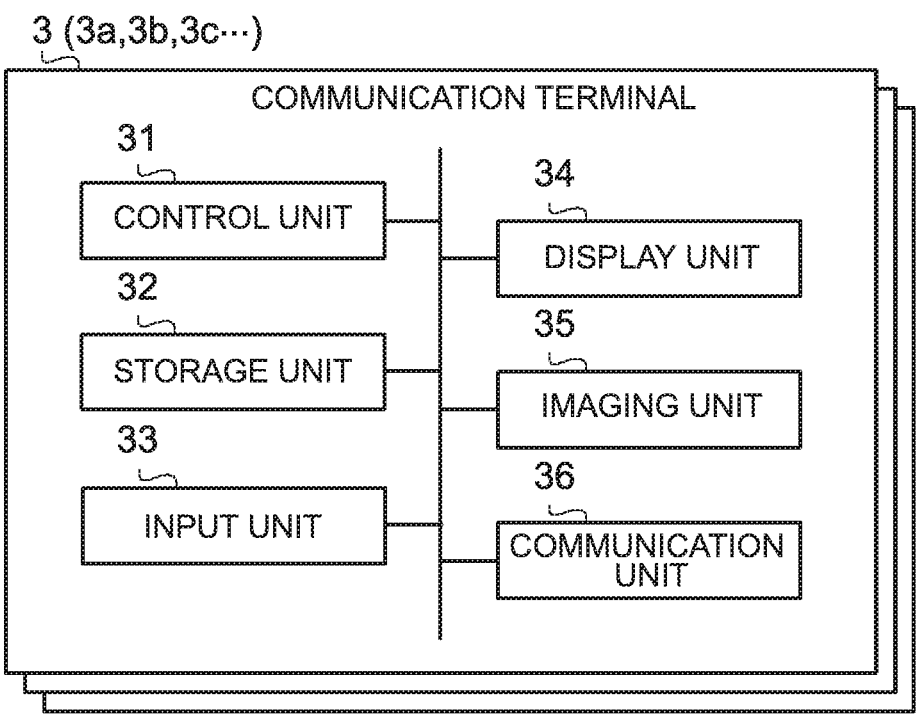
FIG. 3 is a block diagram of the hardware configuration of the communication terminal according to Embodiment 1.

Each of the plurality of communication terminals 3a, 3b, 3c . . . is a terminal operated by a user. Specifically each of the communication terminals 3a, 3b, 3c . . . is a mobile phone, a smart phone, a wearable device or a tablet device, which is a mobile information device that a user can use while carrying it. As shown in FIG. 3, each of the communication terminals 3a, 3b, 3c . . . includes a control unit 31, a storage unit 32, an input unit 33, a display unit 34, an imaging unit 35 and a communication unit 36.

The following collectively describes the plurality of communication terminals 3a, 3b, 3c . . . as a communication terminal 3 when there is no need to make a distinction among them.

The control unit 31 includes a CPU, a ROM and a RAM. In the control unit 31, the CPU reads a control program stored in the ROM and controls the overall operation of the terminal (communication terminal 3) while using the RAM as a work memory. The control unit 31 functions as a control means (terminal-side control means).

The storage unit 32 is a non-volatile memory, such as a flash memory or a hard disk. The storage unit 32 stores programs and data, including an OS and application programs, that the control unit 31 uses for various types of processing. The storage unit 32 also stores data that the control unit 31 creates or acquires during various types of processing.

The input unit 33 includes input devices, such as an entry keys, buttons, switches, a touch pad, and a touch panel. The input unit 33 receives operations and instructions from a user and transmits the received operations and instructions to the control unit 31.

The display unit 34 includes a display device, such as a liquid crystal display or an organic EL display. The display unit 34 is driven by a display driving circuit not illustrated to display various images depending on the situation. Note here that the display unit 34 may be mutually overlapped with the input unit 33 so that the display unit 34 and the input unit 33 make up a touch panel (touch screen).

The imaging unit 35 is a camera, and includes a lens to collect light emitted from a subject of the imaging, an imaging device, such as a CCD (Charge-Coupled Device) configured to receive the collected light and acquire an image of the subject, and an image processing unit to process an image acquired by the imaging device. More specifically the imaging unit 35 captures an image of a two-dimensional code, such as a QR (Quick Response) code (registered trademark) and reads information represented by the two-dimensional code in the image. The imaging unit then feeds the information to the control unit 31.

The communication unit 36 is a communication module to communicate with an external device via an antenna not illustrated under the control of the control unit 31. The communication unit 36 connects to a wide area network via a wireless LAN (Local Area Network), such as Wi-Fi (Wireless Fidelity), to exchange information with the server 4.

The plurality of electronic devices 2a, 2b, 2c . . . and the plurality of communication terminals 3a, 3b, 3c . . . are operated by mutually different users. In one example, user A operates the electronic device 2a and the communication terminal 3a, user B operates the electronic device 2b and the communication terminal 3b, and user C operates the electronic device 2c and the communication terminal 3c. Note here that the electronic devices 2 and the communication terminals 3, the electronic devices 2 and users, and the communication terminals 3 and users do not necessarily have one-to-one correspondences. For instance, a plurality of users may share one electronic device 2 or one communication terminal 3.

Figure 4:
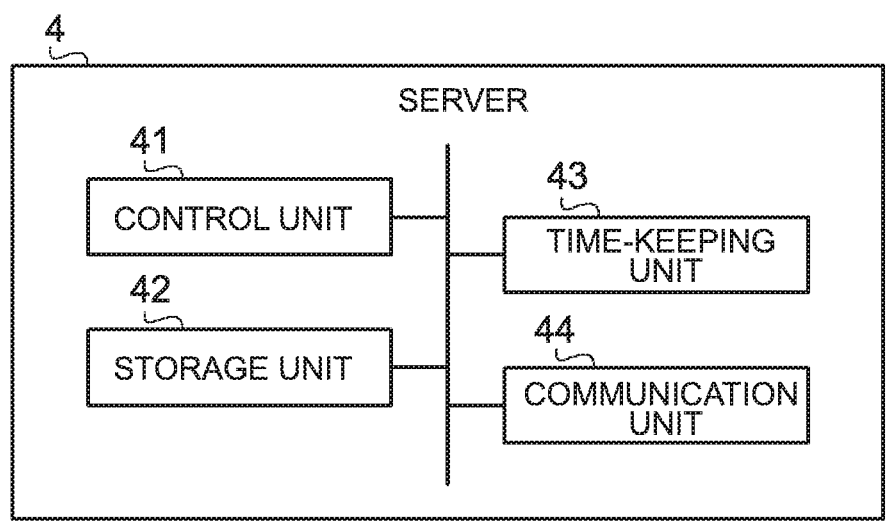
FIG. 4 is a block diagram of the hardware configuration of the server according to Embodiment 1.

Specifically the server 4 is an information processing device, such as a general-purpose computer or a cloud server. The server is installed in a company or an organization that sells or administers the electronic devices 2, for example. The server 4 communicates with the plurality of communication terminals 3a, 3b, 3c . . . to manage the plurality of electronic devices 2a, 2b, 2c . . . about their status of utilization. As shown in FIG. 4, the server 4 includes a control unit 41, a storage unit 42, a time-keeping unit 43 and a communication unit 44.

The control unit 41 includes a CPU, a ROM and a RAM. In the control unit 41, the CPU reads a control program stored in the ROM and controls the overall operation of the server 4 while using the RAM as a work memory. The control unit 41 functions as a control means (server-side control means).

The storage unit 42 is a non-volatile memory, such as a flash memory or a hard disk. The storage unit 42 stores programs and data, including an OS and application programs, that the control unit 41 uses for various types of processing. The storage unit 42 also stores data that the control unit 41 creates or acquires during various types of processing.

The time-keeping unit 43 includes a RTC (Real Time Clock) and functions a time-keeping means to measure the time.

The communication unit 44 is a communication module to communicate with an external device via an antenna not illustrated under the control of the control unit 41. The communication unit 44 connects to a wide area network via a wireless LAN, such as Wi-Fi, to exchange information with each of the plurality of communication terminals 3a, 3b, 3c.

Figure 5:
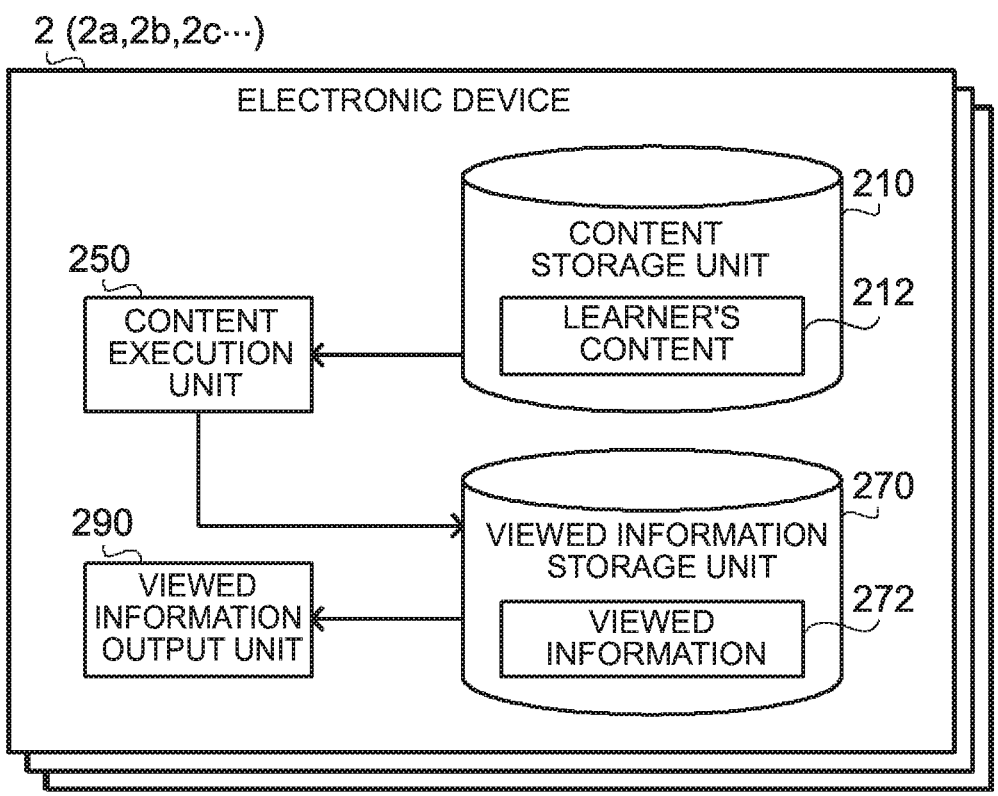
FIG. 5 is a block diagram of the functional configuration of the electronic device according to Embodiment 1.

Referring next to FIG. 5, the following describes the functional configuration of each of the plurality of electronic devices 2a, 2b, 2c . . . . As shown in FIG. 5, each of the electronic devices 2a, 2b, 2c . . . operatively includes a content storage unit 210, a content execution unit 250, a viewed information storage unit 270, and a viewed information output unit 290. In the control unit 21, the CPU reads a program stored in the ROM to the RAM for execution, so that the CPU functions as the content execution unit 250 and the viewed information output unit 290. The content storage unit 210 and the viewed information storage unit 270 are configured in an appropriate storage area of the storage unit 22.

The content storage unit 210 stores learner's content 212 that a user is allowed to view in the electronic device 2. Content is called digital content as well, and contains a series of information, data or programs that are combined for a specific purpose. The learner's content 212 is content for learning, i.e., the content that a user uses for learning.

More specifically the electronic device 2 internally stores a plurality of types of learner's content 212 to learn various subjects, such as foreign languages including English, Japanese, history and mathematics. For instance, the learner's content 212 to learn English are classified into a plurality of categories, such as content for learning vocabulary, content for learning pronunciation, and content for learning conversations. Each of the plurality of types of learner's content 212 belongs to one of a plurality of categories set beforehand, and is associated with such a category.

The content execution unit 250 executes one of the learner's content 212 that a user selects and designates from the plurality of types of learner's content 212 stored in the content storage unit 210. More specifically, the user operates the input unit 23 to designate a desired type of learner's content 212. Receiving a designation of the learner's content 212 from the user, the content execution unit 250 reads the corresponding learner's content 212 from the content storage unit 210 for execution and outputs it so that the user can view the content.

Figure 6:
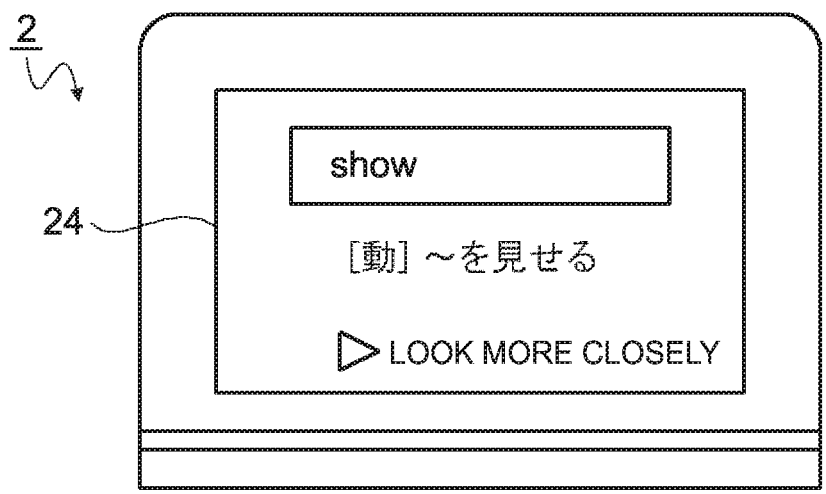
FIG. 6 shows an example of the screen to show learner's content for viewing in the electronic device according to Embodiment 1.

FIG. 6 shows an example of the display on the display unit 24 of the electronic device 2 when the electronic device 2 receives user's designation of the learner's content 212 on English words. As shown in FIG. 6, receiving a designation of the learner's content 212 on English words from the user, the content execution unit 250 displays a screen to learn an English word included in the designated learner's content 212 on the display unit 24 so that the user can view the content. The user who views such a screen can learn the desired learner's content 212 while viewing. The content execution unit 250 is implemented by the control unit 21 in corporation with the storage unit 22, the input unit 23 and the display unit 24. The content execution unit 250 functions as a content execution means.

The result of execution of the learner's content 212 by the content execution unit 250 is stored in the viewed information storage unit 270 as viewed information 272. The viewed information 272 indicates the viewing state of the plurality of types of learner's content 212 stored in the content storage unit 210. The viewing state shows the state of a user's viewing of the learner's content 212 for learning, i.e., the progress of learning with the learner's content 212.

Figures 7, 8:
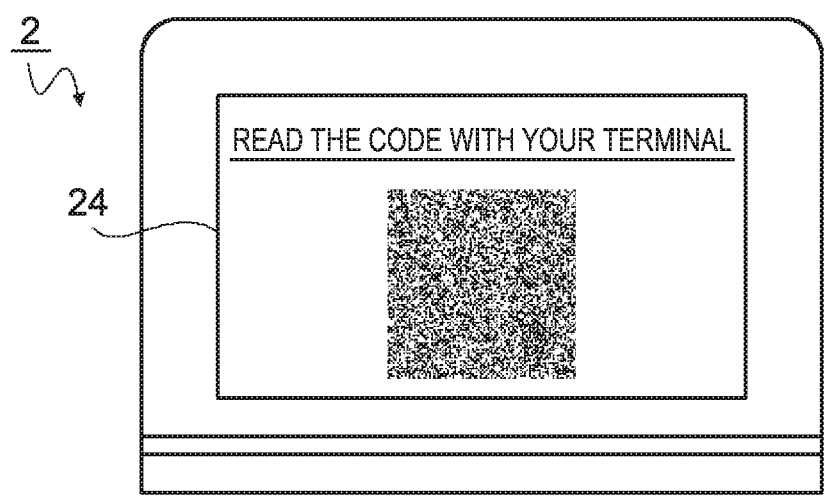
FIG. 7 shows one example of the viewed information stored in the electronic device according to Embodiment 1.
FIG. 8 shows one example of the screen to show a two-dimensional code in the electronic device according to Embodiment 1.

More specifically as shown in FIG. 7, the viewed information 272 contains information on each of the plurality of types of learner's content 212 stored in the content storage unit 210, including information on the category that the learner's content belongs to, the degree of progress as the viewing state, and information on the frequency of viewing. Note here the degree of progress is an index indicating the degree of viewing of the learner's content 212 that the user has viewed. For instance, when the learner's content 212 contains a plurality of quizzes, the degree of progress is indicated with the number or the rate of the quizzes that the user can answer correctly. Alternatively when the learner's content 212 contains a plurality of pieces of audio data, the degree of progress is indicated with the number or the rate of the pieces of the audio data that the user has played back. When the learner's content 212 contains a plurality of pages or headings, the degree of progress is indicated with the number or the rate of the pages or headings that the user has viewed, i.e., displayed on the display unit 24.

FIG. 7 shows one example where the degree of progress is represented with the rate from 0% to 100%. 0% of the degree of progress means that the user did not view the corresponding learner's content 212 (in the example of FIG. 7, content D) at all, and did not start the learning. 100% of the degree of progress means that the user has viewed all of the corresponding learner's content 212 (in the example of FIG. 7, content C), and finished the learning. The frequency of viewing is an index indicating how often the user viewed the corresponding learner's content 212. Specifically the viewed information 272 contains, as the frequency of viewing, information on the number of times of viewing within the last one month for each of the plurality of types of learner's content 212.

In this way, the viewed information 272 contains information indicating the viewing state of each of the plurality of types of learner's content 212. Every time when the content execution unit 250 executes the learner's content 212 designated by the user (i.e., outputs the content so that the user can view it, the content execution unit updates the viewing state of the executed learner's content 212 included in the viewed information 272, i.e., information on the degree of progress and the frequency of viewing.

Referring back to FIG. 5, the viewed information output unit 290 outputs the viewed information 272 stored in the viewed information storage unit 270 in the form of a two-dimensional code. The two-dimensional code is a QR code (registered trademark), for example, which represents the information with a distributing pattern of a plurality of white- or black-colored cells that are disposed vertically and horizontally (like a matrix).

More specifically at predetermined timing in a day (e.g., at 10 pm), the viewed information output unit 290 displays a popup screen on the display unit 24 to encourage the user to update the server 4. Seeing such a popup screen, the user can operate the input unit 23 to input an instruction to output the viewed information 272. Alternatively the user may operate the input unit 23 and input an instruction to output the viewed information 272 at appropriate timing other than the timing when the popup screen appears. Receiving an instruction to output user information, the viewed information output unit 290 reads the latest viewed information 272 stored in the viewed information storage unit 270. The viewed information output unit 290 then creates a two-dimensional code indicating the read viewed information 272, and outputs the created two-dimensional code to the display unit 24 as shown in FIG. 8.

The information indicated with the two-dimensional code contains not only the viewed information 272 but also configuration information, such as a device ID, a user ID, the name of the user, and the current date and time. The device ID is an ID (identification information) to identify the electronic device 2. The plurality of electronic devices 2a, 2b, 2c . . . have mutually different IDs set during the manufacturing, for example. The user ID is an ID to identify the user. The user inputs their own ID on the login screen, for example, when they start to operate the electronic device 2 or the communication terminal 3. The name of the user is a nickname of the user in the information processing system 1. The user can set any name on the setting screen of the electronic device 2 or the communication terminal 3, for example. The viewed information output unit 290 creates a two-dimensional code indicating the viewed information 272 as well as such configuration information and outputs the created two-dimensional code to the display unit 24.

In this way, the viewed information output unit 290 is implemented by the control unit 21 in corporation with the storage unit 22 and the display unit 24. The viewed information output unit 290 functions as a viewed information output means. The display unit 24 functions as a display means to display a two-dimensional code.

Figure 9:
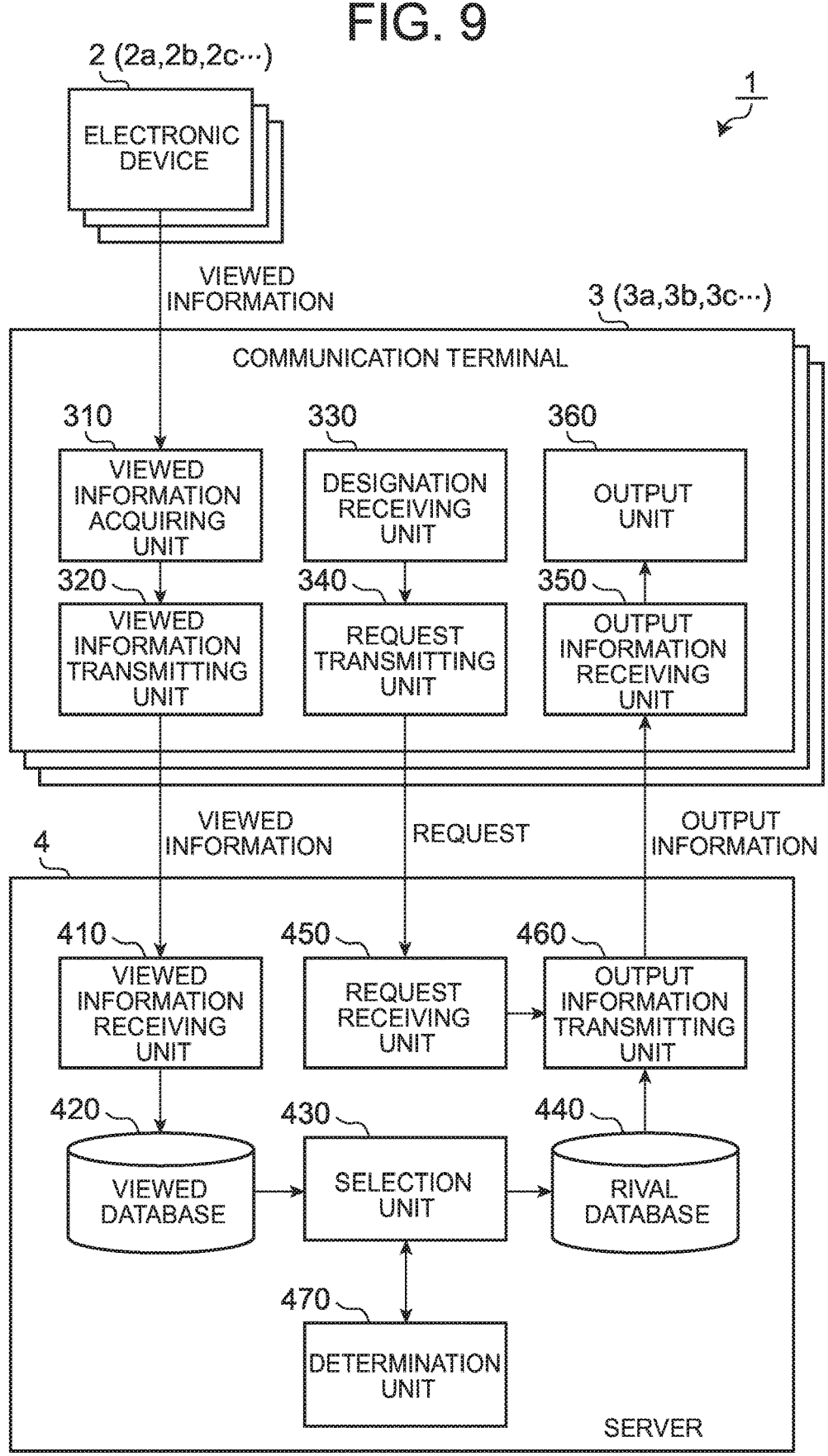
FIG. 9 is a block diagram of the functional configuration of the communication terminals and the server according to Embodiment 1.

Referring next to FIG. 9, the following describes the functional configuration of each of the communication terminal 3a, 3b, 3c . . . and of the server 4. As shown in FIG. 9, each of the communication terminal 3a, 3b, 3c . . . operatively includes a viewed information acquiring unit 310, a viewed information transmitting unit 320, a designation receiving unit 330, a request transmitting unit 340, an output information receiving unit 350, and an output unit 360. In the control unit 31, the CPU reads a program stored in the ROM to the RAM for execution, so that the CPU functions as these units.

The viewed information acquiring unit 310 acquires the viewed information 272 from the electronic device 2. Specifically the user holds and moves their own electronic device 2 or communication terminal 3 while operating it so that the two-dimensional code displayed on the display unit 24 of the electronic device 2 can be within the visual field of the imaging unit 35 of the communication terminal 3. Keeping this, the user operates the input unit 33 to capture an image of the two-dimensional code with the imaging unit 35. The viewed information acquiring unit 310 analyzes the two-dimensional code captured by the imaging unit 35 to read the information from the two-dimensional code.

In this way, the viewed information acquiring unit 310 reads the two-dimensional code on the display unit 24 of the electronic device 2 by the imaging unit 35 to acquire the viewed information 272 as well as the configuration information. Such a two-dimensional code allows the communication terminal 3 to easily acquire information from the electronic device 2 if the electronic device 2 does not have a function to communicate with an external device in a wired or a wireless manner. The viewed information acquiring unit 310 is implemented by the control unit 31 in corporation with the imaging unit 35. The viewed information acquiring unit 310 functions as an acquiring means.

The viewed information transmitting unit 320 transmits the viewed information 272 acquired by the viewed information acquiring unit 310 to the server 4. More specifically when the viewed information acquiring unit 310 acquires the viewed information 272 and the configuration information from the electronic device 2, the viewed information transmitting unit 320 communicates with the server 4 via the communication unit 36 and a wide area network to transfer the acquired viewed information 272 in association with the configuration information acquired at the same time to the server 4. The viewed information transmitting unit 320 is implemented by the control unit 31 in corporation with the communication unit 36. The viewed information transmitting unit 320 functions as a viewed information transmitting means.

As shown in FIG. 9, the server 4 operatively includes a viewed information receiving unit 410, a selection unit 430, a request receiving unit 450, an output information transmitting unit 460 and a determination unit 470. In the control unit 41, the CPU reads a program stored in the ROM to the RAM for execution, so that the CPU functions as these units. The server 4 also includes a viewed database 420 and a rival database 440. These viewed database 420 and rival database 440 are configured in an appropriate storage area of the storage unit 42.

When each of the communication terminals 3a, 3b, 3c . . . transmits their viewed information 272, the viewed information receiving unit 410 receives the transmitted viewed information 272. The viewed information receiving unit 410 is implemented by the control unit 41 in corporation with the communication unit 44. The viewed information receiving unit 410 functions as a viewed information receiving means.

Receiving the viewed information 272 and the configuration information from each of the communication terminals 3a, 3b, 3c . . . , the viewed information receiving unit 410 updates the viewed database 420 with the received viewed information 272. The viewed database 420 stores data indicating the viewing state of the learner's content 212 by each of the plurality of users who operate the plurality of electronic devices 2a, 2b, 2c . . . for learning.

FIG. 10 shows an example of the data stored in the viewed database 420. As shown in FIG. 10, the viewed database 420 stores the user ID, the nickname, and the viewing state (the degree of progress and the frequency of viewing) of the plurality of types of learner's content 212 for each of the plurality of users. The user ID and the nickname are information to uniquely identify each user, which are contained in the configuration information transmitted together with the viewed information 272 from the communication terminal 3. The degree of progress and the frequency of viewing are data similar to those in the viewed information 272 of the communication terminal 3 shown in FIG. 7. Every time receiving the viewed information 272 from any one of the plurality of communication terminals 3a, 3b, 3c . . . , the viewed information receiving unit 410 updates the degree of progress and the frequency of viewing of the corresponding user in the viewed database 420 with the degree of progress and the frequency of viewing in the received viewed information 272.

Referring back to FIG. 9, the selection unit 430 selects a rival user for each of the plurality of users based on the data stored in the viewed database 420. The rival user means a user as a competitor to improve each user's motivation for learning when the user views the learner's content 212 of the electronic device 2 for learning. The selection unit 430 selects such a rival user for each user based on the viewing state of the users for each of the plurality of types of learner's content 212 as the target (hereinafter called "target content") that the users can view with the electronic device 2.

More specifically the selection unit 430 selects a first user as a rival user from a plurality of users other than one user based on the viewing state of the target content by the one user and the viewing states of the target content by the other plurality of users. Note here that the one user is a user as a target to select a rival user (hereinafter called a "target user") for him/her. The other plurality of users different from the one user are users as candidates of the rival user (hereinafter called "candidate users"). They are the users other than the target user among the plurality of users who are learning the target content with any one of the electronic devices 2. For instance, when the number of the plurality of users who are learning the target content is N, then selection unit 430 selects a rival user from the (N−1) candidate users other than the target user.

More specifically the selection unit 430 refers to the viewed database 420 about the frequency of viewing of the target content by the plurality of candidate users, and selects, from the plurality of candidate users, one or more users having the number of times of viewing of the target content that is a predetermined number or more within a predetermined period of time. The predetermined period of time is preset at from the last few weeks to one month, for example. The predetermined number of times is preset at several times, for example.

In other words, the selection unit 430 selects, from the plurality of candidate users, one or more users who have viewed the target content the predetermined number of times or more within the most recent predetermined period of time. In this way, the selection unit 430 excludes users who hardly viewed the target content within the most recent period of time from the candidates of the rival user, and narrows down the candidates so as to include the users who have viewed the target content at least several times. This is because such users who have viewed the target content at least several times with the most recent period of time are more suitable for the rival user to improve the motivation of the target user for competition than users who hardly viewed the target content within the period of time.

After selecting one or more users from the plurality of candidate users based on their number of times of viewing, then the selection unit 430 further selects, as the rival users, users having a difference in the index indicating the degree of viewing of the target content from that of the target user within a predetermined range. More specifically the index indicating the degree of viewing of the target content is the degree of progress of learning, which is a value having the rate from 0% to 100% as shown in FIGS. 7 and 10.

The selection unit 430 refers to the viewed database 420 about the viewing state of the target content by the plurality of candidate users, and compares the degree of progress of the target content by the target user with the degree of progress of the target content by the selected one or more users. Then the selection unit 430 selects, as the rival users, one or more users having a difference in the degree of progress of the target content from that of the target user within a predetermined range. The predetermined range is preset at a value, such as 5%, 10% or 20%, for example.

More specifically when there are a plurality of users having a difference in the degree of progress of the target content from that of the target user, the selection unit 430 selects a predetermined number of users having higher degree of progress of the target content than the target user and selects a predetermined number of users having lower degree of progress of the target content than the target user. The predetermined number is preset at a value, such as one or two, for example. In this way, the selection unit 430 selects, as the rival users, both of the users having higher degree and lower degree of progress of the target content relative to the target user to be in an balanced way. The predetermined range and the predetermined number can be changed by the user with the communication terminal 3.

The selection unit 430 executes such processing of selecting rival users while setting each of the plurality of users as the target user and setting each of the plurality of types of learner's content 212 as the target content. In this way the selection unit 430 selects rival users for each of the plurality of users and in the units of a plurality of types of the learner's content 212. The selection unit 430 is implemented by the control unit 41 in corporation with the storage unit 42. The selection unit 430 functions as a selection means.

After selecting the rival users, the selection unit 430 updates the rival database 440 in accordance with the selected rival users. The rival database 440 stores data on the rival users selected by the selection unit 430.

FIG. 11 shows an example of the data stored in the rival database 440. FIG. 11 shows one example of the data when user A is the target user and content A is the target content. FIG. 11 shows the example where the selection unit 430 selects, as the rival users, two users P and Q (rivals 1 and 2) having higher degree of progress of the target content than user A and two users R and S (rivals 3 and 4) having lower degree of progress of the target content than user A.

As shown in FIG. 11, the rival database 440 stores the status, the user ID, the nickname, the output name, the degree of progress of the target content and the change rate of the degree of progress for the target content for the target user and each of the rival users. The status is information indicating whether the users are the target user or the rival users. The user ID and the nickname are information to uniquely identify each user, which are the same as those stored in the viewed database 420.

In the rival database 440, the output name is the name of each rival user used to output the viewing state of the rival user. In the example of FIG. 11, all of the output names of the four rival names are the same as their nicknames. In this way, the output name is the same as the nickname in the initial setting. Unless the rival users are changed to another user, the output names are kept as the same names as the nicknames.

In the rival database 440, the degree of progress of the target content is an index indicating the degree of viewing of the target content that the user has viewed, which is the same as the data stored in the viewed database 420. An example of FIG. 11 shows the target user and four rival users that are arranged in descending order of the degree of progress. The change rate in the database shows a change rate of the degree of progress for the target content between the updating before the last updating and the last updating. For instance, when the degree of progress is updated from 20% to 30% at the last updating, the change rate can be calculated as 10% that is a difference between 30% and 20%.

The rival database 440 stores data as shown in FIG. 11 for each of the plurality of users and for each of the plurality of types of learner's content 212. In other words, when the number of users as the target users is L and the number of types of learner's content 212 that are available as the target is M, then the rival database 440 stores (L×M) pieces of different data showing the viewing state of one or more rival users as shown in FIG. 11.

Referring back to FIG. 9, the designation receiving unit 330 in each of the plurality of communication terminals 3*a*, 3*b*, 3*c* . . . receives designation of the target content. When the user wants to know their own rival users, the user may operate the input unit 33 to activate a specific application program that is installed in the communication terminal 3 beforehand. Then the user designates a desired type of learner's content 212 from the plurality of types of learner's content 212 that the user has learned with the electronic device 2 via the activated application program. In this way, the designation receiving unit 330 receives designation of the target content that is input by the user. The designation receiving unit 330 is implemented by the control unit 31 in corporation with the input unit 33. The designation receiving unit 330 functions as a designation receiving means.

When the designation receiving unit 330 receives designation of the target content in this way, then the request transmitting unit 340 transmits a request for the viewing state of the target content by rival users to the server 4. More specifically when the designation receiving unit 330 receives designation of the target content, then the request transmitting unit 340 communicates with the server 4 via the communication unit 36 and a wide area network and transmits a request to the server 4. The transmitted request includes information on the target content that the designation receiving unit 330 has received the designation, and the user ID to identify the user who designated the target content. The request transmitting unit 340 is implemented by the control unit 31 in corporation with the communication unit 36. The request transmitting unit 340 functions as a request transmitting means.

When each of the communication terminals 3*a*, 3*b*, 3*c* . . . transmits the request, the request receiving unit 450 in the server 4 receives the transmitted request. The request receiving unit 450 is implemented by the control unit 41 in corporation with the communication unit 44. The request receiving unit 450 functions as a request receiving means.

The output information transmitting unit 460 outputs information on the viewing state of the learner's content 212 by the rival users selected by the selection unit 430. More specifically when the request receiving unit 450 receives a request, the output information transmitting unit 460 specifies data, from the data stored in the rival database 440, having the user operating the communication terminal 3 that transmitted the request as the target user and the learner's content 212 designated by this request as the target content. Then the output information transmitting unit 460 refers to the specified data and transmits output information indicating the viewing state of the target content by the rival users to the communication terminal 3 among the plurality of communication terminals 3*a*, 3*b*, 3*c* . . . that transmitted the request.

For instance, when user A transmits the request received by the request receiving unit 450 and this request indicates content A as the target content, then the output information transmitting unit 460 outputs output information based on the data shown in FIG. 11. Specifically the output information transmitting unit 460 transmits the output information indicating the degree of progress of content A by four rival users P, Q, R and S and their output names to the communication terminal 3 that transmitted the request. The output information transmitting unit 460 is implemented by the control unit 41 in corporation with the communication unit 44. The output information transmitting unit 460 functions as a output information transmitting means.

When the server 4 transmits the output information, then the output information receiving unit 350 in each of the plurality of communication terminals 3a, 3b, 3c . . . receives the transmitted output information. The output information receiving unit 350 is implemented by the control unit 31 in corporation with the communication unit 36. The output information receiving unit 350 functions as a output information receiving means.

Figures 12, 13:
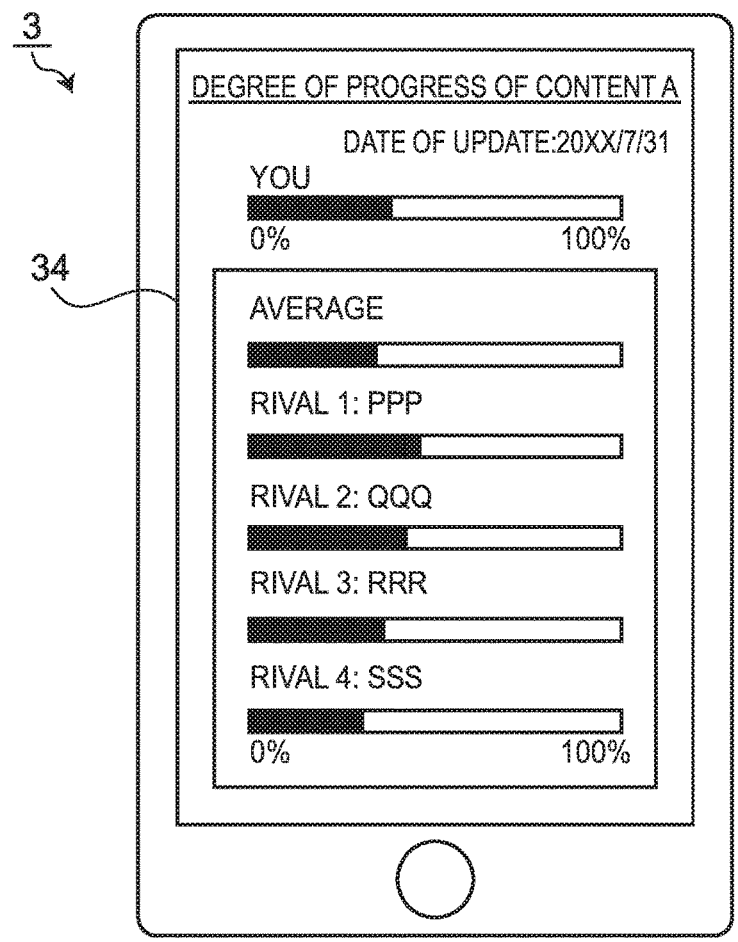
FIG. 12 shows a second example of the output screen in the communication terminal according to Embodiment 1.
FIG. 13 shows a second example of the rival database stored in the server according to Embodiment 1.

The output unit 360 outputs viewing state of the learner's content 212 by rival users, which is indicated by the output information that the output information receiving unit 350 receives. Specifically as shown in FIG. 12, the output unit 360 associates the degree of progress of the target content by four users as the rival users of user A with the output names of "PPP", "QQQ", "RRR" and "SSS", respectively, and displays this on the display unit 34. At this time, the output unit 360 displays the degree of progress of the target content by the rival users together with the degree of progress of the target content by the target user (in the example of FIG. 12, user A) and the average of the degree of progress of the target content of a plurality of users as a whole on the screen. This is for easy comparison of the degree of progress between the user and the rivals.

In this way, the target user can see the displayed viewing state by the rival users and can know the degree of learning by other users easily. This can improve the user's motivation for learning. The output unit 360 displays the viewing state of the users as the rival users having the degree of progress of learning similar to that of the user, and so the motivation of the target user for learning can improve more effectively. The output unit 360 is implemented by the control unit 31 in corporation with the display unit 34. The output unit 360 functions as an output means.

Referring back to FIG. 9, the determination unit 470 of the server 4 determines whether the viewing state of the target content by the target user satisfies a predetermined condition or not. The predetermined condition is set beforehand to determine whether rival users of the target user should be changed to another user or not. The determination unit 470 is implemented by the control unit 41 in corporation with the storage unit 42. The determination unit 470 functions as a determination means.

More specifically the predetermined condition is satisfied when the change rate of the degree of progress for the target content by the target user during a first period of time is smaller than the change rate of the degree of progress during a second period of time before the first period of time. Specifically the first period of time is the period of time between the updating before the last updating of the viewing state for the target content stored in the viewed database 420 and the last updating. The second period of time is the period of time between the second to last updating of the target content stored in the viewed database 420 and the updating before the last updating. For instance, when the viewed database 420 is updated at a predetermined time every day, the first period of time corresponds to the most recent one day (i.e., the most recent 24 hours) and the second period of time corresponds to one day immediately before the first period of time (i.e., from 48 hours to 24 hours before the current time).

The determination unit 470 compares the change rate of the degree of progress for the target content by the target user, specifically compares the change rate (increasing rate) of the degree of progress between the first period of time and the second period of time. Then the determination unit 470 determines whether the change rate of the degree of progress during the first period of time increases or decreases from the change rate of the degree of progress during the second period of time. In other words, the determination unit 470 determines whether the change rate of the degree of progress decreases from that in the day before or not, for example. When the change rate of the degree of progress for the target content by the target user decreases, the determination unit 470 determines that the predetermined condition is satisfied.

FIG. 13 shows the rival database 440 where user A is the target user and content A is the target content similarly to FIG. 11, and this rival database 440 is after the updating of the database shown in FIG. 11. That is, FIGS. 11 and 13 show the rival database 440 before and after the first period of time, respectively. In FIG. 13, the change rate of user A (change rate in the first period of time) is 7%, which is lower than 10% of the change rate (change rate in the second period of time) in FIG. 11. As a result of this, the degree of progress of user A in FIG. 13 is inferior to user R unlike the time of FIG. 11.

In this way, when the change rate of the degree of progress for the target content is lower in the first period of time than in the second period of time, this may imply the lowering of the motivation of the target user for learning by viewing the target content. When the selection unit 430 selects first users as the rival users from a plurality of candidate users and then the determination unit 470 determines that the viewing state of the target content by the target user satisfies the predetermined condition, then the selection unit selects, as the rival users, second users different from the first users among the plurality of candidate users based on the viewing state of the target content by the target user and the viewing state of the target content by the plurality of candidate users. In other words, the selection unit 430 changes the rival user from the first users to the second users so as to improve the motivation for learning of the target user more.

More specifically the determination unit 470 calculates the ratio of the users having higher degree of progress for the target content than that of the target user among one or more rival users (the first users). Specifically three users P, Q, and R have higher degree of progress than that of user A among the four rival users in the example of FIG. 13, and so the determination unit calculates the ratio of the users having higher degree of progress than that of the target user as ¾ (75%). Then the determination unit 470 determines whether the calculated ratio is larger than a predetermined ratio or not. This predetermined ratio is preset at a value of 50%, for example. The selection unit 430 executes the following (1) or (2) in accordance with the result of determination by the determination unit 470.

(1) When such a determination by the determination unit 470 shows that the ratio of the users having higher degree of progress for the target content than that of the target user among one or more rival users (first users) is higher than the predetermined ratio (50%), the selection unit 430 changes one or more users having higher degree of progress than that of the target user among one or more rival users to a new rival user (a second user). In other words, when the rank of the target user is relatively low among the rival users (is included at a lower rank of 50%) and the change rate of the degree of progress deteriorates, then this may imply that the target user has a character of a person who can improve the motivation of learning when he/she is at a higher rank than the rivals. In this case, the rival users having higher degree of progress than that of the target user are changed to a rival user having lower degree of progress so as not to degrade the motivation of learning of the target user.

Specifically three users P, Q, and R have higher degree of progress than that of user A among the four rival users P, Q, R and S in the example of FIG. 13. In this case the selection unit 430 changes the three rival users P, Q and R to other rival users.

Figures 14, 15:
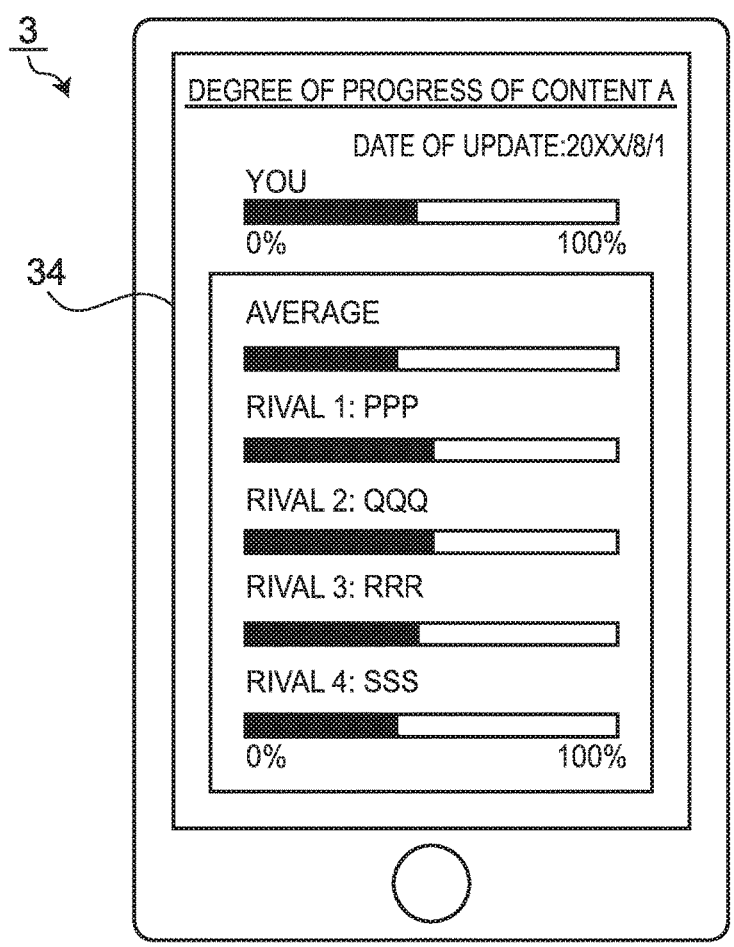
FIG. 14 shows a third example of the rival database stored in the server according to Embodiment 1.
FIG. 15 shows a second example of the output screen in the communication terminal according to Embodiment 1.

FIG. 14 shows the example where the rival database 440 shown in FIG. 13 is changed in this way, i.e., three rival users P, Q and R having higher degree of progress than that of user A are changed to new rival users X, Y and Z (the users surrounded with dashed line in FIG. 14). The selection unit 430 selects these three users X, Y and Z having smaller change rate of the degree of progress than that of the target user as new rival users (second users) from the plurality of candidate users instead of the three rival users P, Q and R.

More specifically the selection unit 430 selects these new rival users X, Y and Z from a plurality of candidate users, where these rival users have the change rate of the degree of progress for the target content that is a half or less of the change rate of user A that is 7%. In this way, the selection unit changes the rival users to have users having a smaller change rate, whereby the degree of progress of the target user increases relatively among the rival users.

In this context, the selection unit 430 selects these new rival users from the users having the degree of progress higher than the degree of progress that the rival users P, Q and R before the changing had at the time before the first period of time (i.e., at a time when the rival database 440 is in the state of FIG. 11). For instance, in the rival database 440 of FIG. 14, the newly selected rival users X, Y and Z have the degree of progress (40%, 39% and 33%) that are higher than the degree of progress (38%, 36% and 28%) of the rival users P, Q and R before the changing. If the degree of progress of the rival users after changing is lower than that before the changing, the user may have an impression that the degree of progress of the rival users is manipulated awkwardly. This selection by the selection unit is performed to avoid such impression by the user.

(2) When the determination by the determination unit 470 shows that the ratio of the users having higher degree of progress for the target content than that of the target user among one or more rival users (first users) is lower than the predetermined ratio (50%), the selection unit 430 changes one or more users having lower degree of progress than that of the target user among the one or more rival users to a new user (a second user). In other words, although the rank of the target user is relatively high among the rival users (is included at a higher rank of 50%), the change rate of the degree of progress deteriorates. This may imply that the target user has a character of a person who can improve the motivation of learning when his/her rivals are more competitive. In this case, the rival users having lower degree of progress than that of the target user are changed to a rival user having higher degree of progress so as not to degrade the motivation of learning of the target user.

The following processing is similar to that in the above (1) other than that the magnitude relationship about the degree of progress and the change rate is reversed. Specifically the selection unit 430 selects one or more users having larger change rate of the degree of progress than that of the target user as new rival users (second users) among the plurality of candidate users. In one example not illustrated, when three rival users Q, R and S have the degree of progress lower than that of user A among four rival users P, Q, R and S, then the selection unit 430 changes these three rival users Q, R and S to other rival users having higher change rate of the degree of progress than that of user A.

More specifically the selection unit 430 selects, from the plurality of candidate users, users having the change rate of the degree of progress for the target content that is twice or more the change rate of user A as new rival users X, Y and Z. In this way, the selection unit changes the rival users to have users having a larger change rate, whereby the degree of progress of the target user decreases relatively among the rival users.

In this context, similarly to the processing in the above (1), the selection unit 430 selects these new rival users from the users having the degree of progress higher than the degree of progress that the rival users P, Q and R before the changing had at the time before the first period of time (i.e., at a time when the rival database 440 is in the state of FIG. 11). If the degree of progress of the rival users after changing is lower than that before the changing, the user may have an impression that the viewing state of the rival users is manipulated awkwardly. This selection by the selection unit is performed to avoid such impression by the user.

After selecting the new second users as the rival users through the processing of the above (1) or (2), the selection unit 430 updates the rival database 440 in accordance with the newly selected second users. For instance, when the selection unit 430 selects new rival users instead of the three rival users P, Q and R in the rival database 440 in FIG. 13, then the selection unit 430 changes the rivals 1 to 3 to new rival users X, Y and Z in the rival database 440 as shown in FIG. 14. Then the selection unit 430 changes the items of the user ID, the nickname, the degree of progress and the change rate from the data of the rival users P, Q and R before the changing to those of the new rival users X, Y and Z.

Note here that the new rival users X, Y and Z have their respective and unique nicknames of "XXX", "YYY" and "ZZZ" as shown in FIG. 14. Meanwhile, the selection unit 430 does not change the output names of the new rival users X, Y and Z to their respective nicknames so as not to let the user know the change of rival users, and keeps the output names "PPP", "QQQ" and "RRR" of the rival users P, Q and R before the changing.

After updating of the rival database 440, when the request receiving unit 450 receives a request from the communication terminal 3, then the output information transmitting unit 460 outputs information indicating the viewing state of the target content by the newly selected rival users (second users) selected by the selection unit 430. For instance, after updating of the rival database 440 to the state of FIG. 14, when the communication terminal 3 of user A requests the viewing state of content A by rival users, then the output information transmitting unit 460 transmits output information indicating the degree of progress of content A by four rival users X, Y, Z and S and their output names to the communication terminal 3 that transmitted the request.

When the server 4 transmits the output information, then the output information receiving unit 350 in each of the plurality of communication terminals 3a, 3b, 3c . . . receives the transmitted output information. The output unit 360 outputs viewing state of the learner's content 212 by rival users, which is indicated by the output information that the output information receiving unit 350 receives. Specifically as shown in FIG. 15, the output unit 360 associates the degree of progress of the target content by four users as the rival users of user A with the output names of the respective rival users, and displays this on the display unit 34. FIG. 15 is the screen in one example that is output one day after the screen shown in FIG. 12.

In this way, the information processing system 1 dynamically updates the rival users in accordance with the change of the viewing state of the target user and outputs the viewing state by the rival users. This allows the target user to keep the competitive motivation and continue the learning when the rival users are not suitable for rivals, such as in the case where the rival users stop the learning or a difference in progress becomes large between the target user and the rival users.

In such a case, the output unit 360 still associates the degree of progress of the target content by new rival users with the nicknames of the rival users before the changing even when the nicknames of the new rival users (second users) are different from the nicknames of the rival users before the changing (first users), and outputs the information. The output screen shown in FIG. 15, for example, is changed from the output screen shown in FIG. 12 so that three of the four rival users have changed from users P, Q and R to users X, Y and Z. The output unit 360, however, still associates the degree of progress of the new three rival users X, Y and Z with the nicknames "PPP", "QQQ" and "RRR" of the rival users P, Q and R before the changing and displays them on the display unit 34.

In this way, the names of the rival users before changing are continuously output even after changing the rival users, which can leave the target user not knowing the change of the rival users. This allows the target user to have the sense of competing with specific rival users for the degree of progress. As a result, the target user can improve the motivation for learning while having a stimulus from the rival users for the competition.

Figure 16:
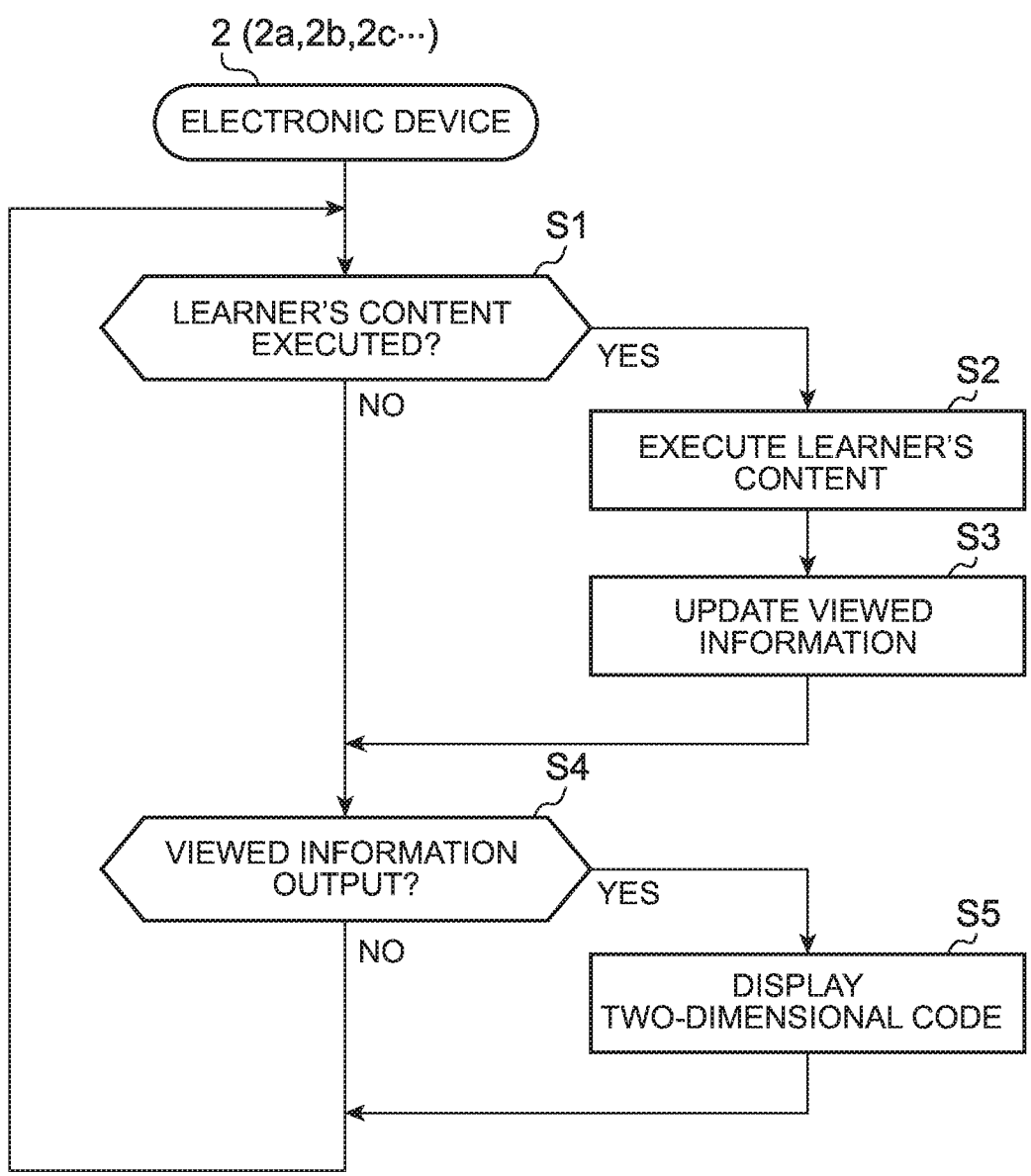
FIG. 16 is a flowchart of the processing executed by the information processing system of Embodiment 1.
Figure 17:
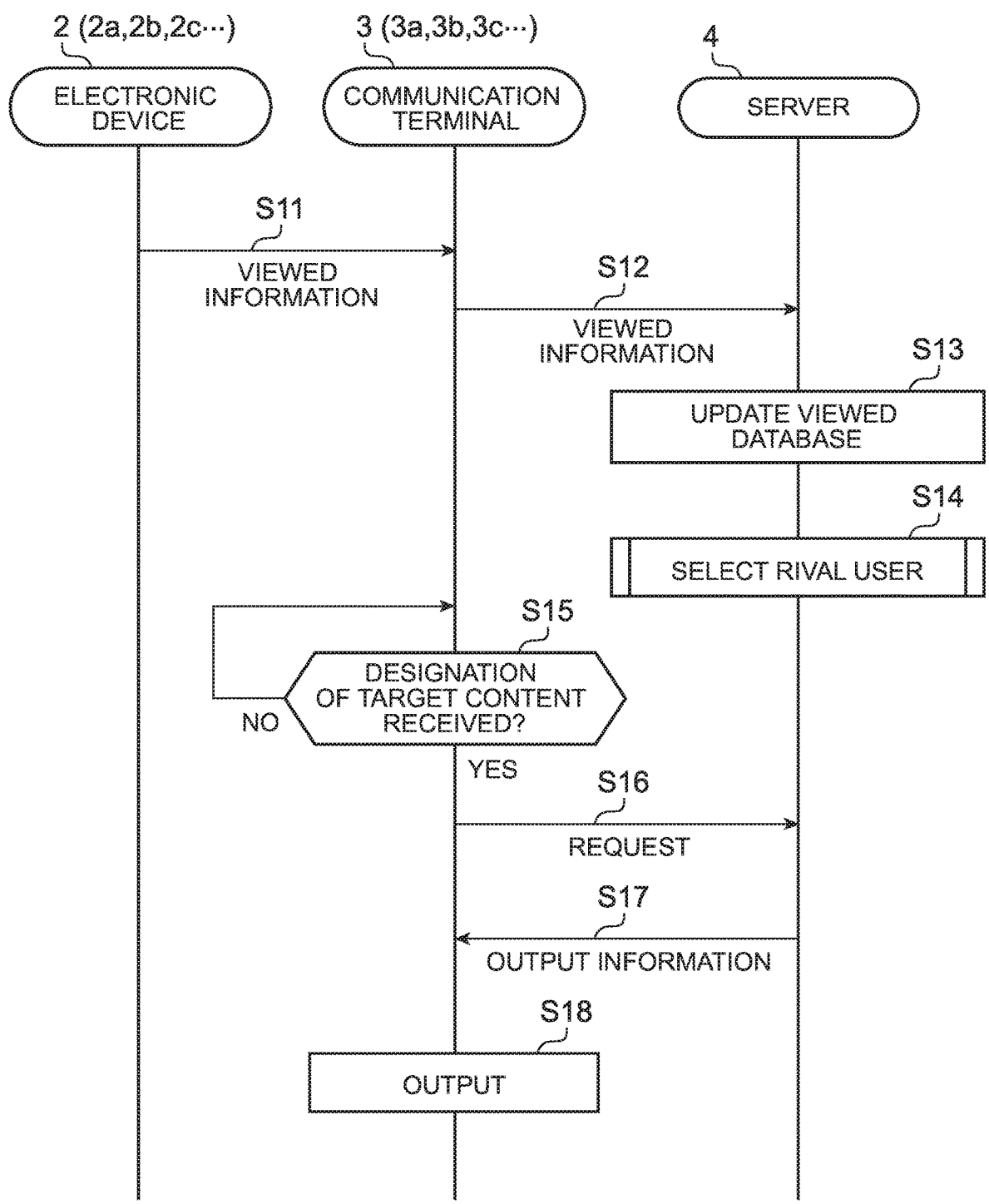
FIG. 17 shows a sequence for the processing flow executed by the information processing system of Embodiment 1.
Figure 18:
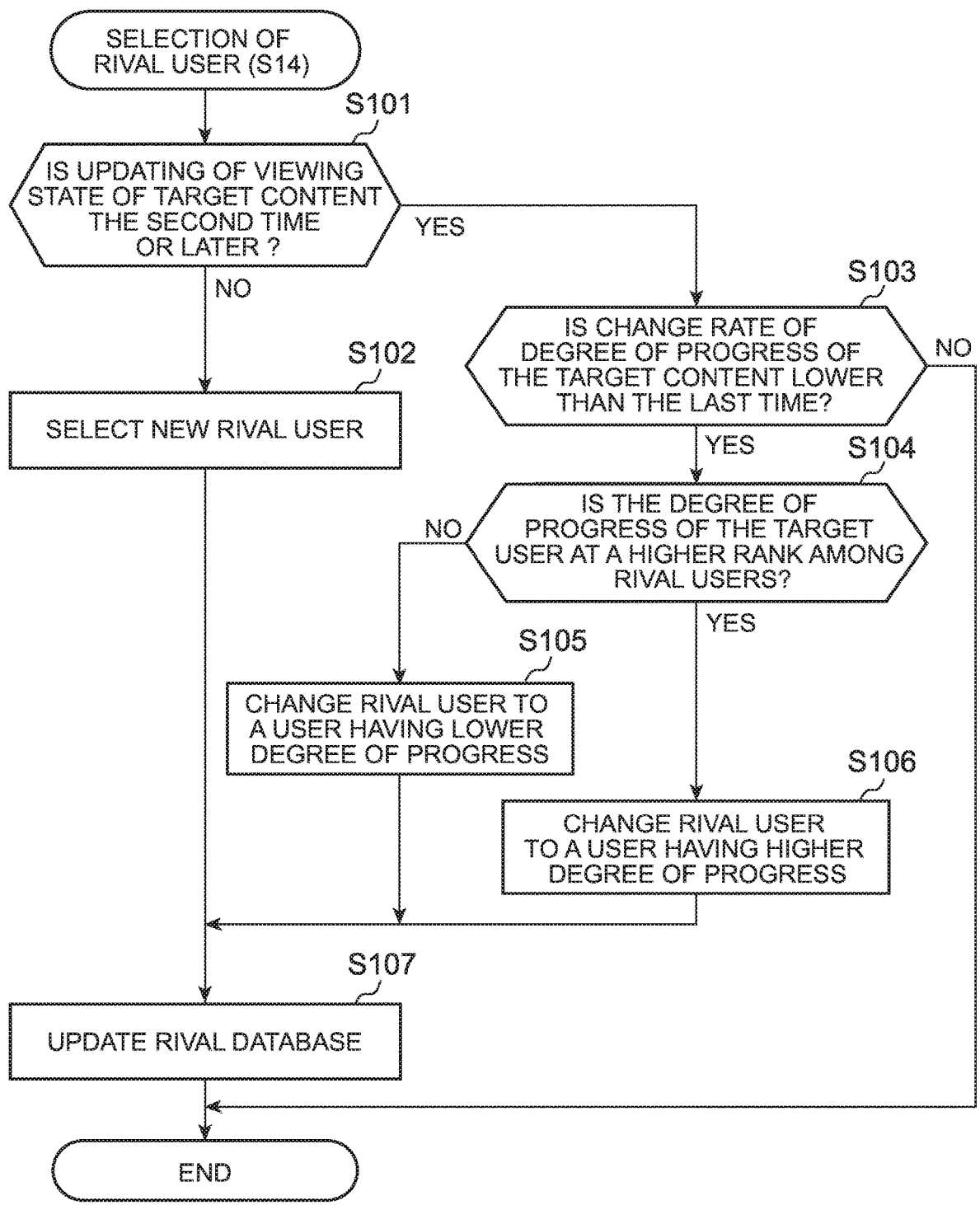
FIG. 18 is a flowchart of the selection of rival users executed by the server in Embodiment 1.

Referring now to FIGS. 16, 17 and 18, the following describes the flow of the processing executed by the information processing system 1 having the above structure.

FIG. 16 shows the flow of the processing executed by each of the plurality of electronic devices 2a, 2b, 2c . . . . The processing of FIG. 16 is executed at appropriate timing when the power of each of the plurality of electronic devices 2a, 2b, 2c . . . is turned on so that the device can start a normal operation.

When the processing shown in FIG. 16 starts, the control unit 21 firstly determines whether an instruction to execute learner's content 212 is received or not (Step S1). More specifically the user can operate the input unit 23 of the electronic device 2 so as to input an instruction to execute a desired type of learner's content 212 among the plurality of types of learner's content 212 stored in the content storage unit 210. In this way, the control unit 21 determines whether an instruction to execute any type of the learner's content 212 is received from the user or not.

When receiving an instruction to execute the learner's content 212 (Step S1; YES), then the control unit 21 functions as the content execution unit 250 to execute the designated type of learner's content 212 (Step S2). More specifically the control unit 21 displays a screen for learning shown in FIG. 6, for example, on the display unit 24 in accordance with the instructed type of learner's content 212 so as to allow the user to view the screen. In this way, the user can learn the desired type of learner's content 212.

When the learner's content 212 is executed, the control unit 21 updates the viewed information 272 stored in the viewed information storage unit 270 (Step S3). More specifically the control unit 21 updates the viewing state of the corresponding type of learner's content 212 in the viewed information 272 depending on the situation of the learning, such as the user stopped the learning of the learner's content 212 executed at Step S2 or the user finished the learning.

When the control unit updates the viewed information 272 or when no instruction to execute learner's content 212 is received (Step S1; NO), then the control unit 21 secondly determines whether an instruction to output the viewed information 272 stored in the viewed information storage unit 270 is received or not (Step S4). More specifically in response to the displaying of a popup screen to urge the user to update the server 4 on the display unit 24 or at any other timing, the user inputs an instruction to output the viewed information 272 via the input unit 23. The control unit 21 determines whether such an instruction to output the viewed information 272 is received from the user or not.

When an instruction to output the viewed information 272 is received (Step S4; YES), the control unit 21 functions as the viewed information output unit 290 and creates a two-dimensional code indicating the viewed information 272 stored in the viewed information storage unit 270. Then the control unit 21 displays the created two-dimensional code on the display unit 24 as shown in FIG. 8 (Step S5).

When the two-dimensional code is displayed or when no instruction to output the viewed information 272 is received (Step S4; NO), the control unit 21 returns the procedure to Step S1. In this way, the control unit 21 executes the learner's content 212 appropriately and outputs the viewed information 272 in the form of a two-dimensional code in accordance with the input received from the user.

Referring next to FIG. 17, the following describes the flow of the processing executed among the plurality of electronic devices 2a, 2b, 2c . . . , the plurality of communication terminals 3a, 3b, 3c . . . , and the server 4.

The processing of FIG. 17 starts when the control unit 31 in each of the plurality of communication terminals 3a, 3b, 3c . . . acquires the viewed information 272 from the corresponding electronic device 2 (Step S11). More specifically the control unit 31 makes the imaging unit 35 capture the two-dimensional code that is displayed on the display unit 24 of the electronic device 2 to acquire the viewed information 272 indicated with the two-dimensional code.

After acquiring the viewed information 272 from the electronic device 2, the control unit 31 functions as the viewed information transmitting unit 320 and transmits the acquired viewed information 272 to the server 4 via a wide area network (Step S12). The control unit 41 of the server 4 functions as the viewed information receiving unit 410. Receiving the viewed information 272 from each of the communication terminals 3a, 3b, 3c . . . , the viewed information receiving unit 410 receives the transmitted viewed information 272.

Receiving the viewed information 272, the control unit 41 updates the viewed database 420 (Step S13). More specifically, in accordance with the viewing state indicated with the newly received viewed information 272, the control unit 41 updates the viewing state of the corresponding users stored in the viewed database 420.

After updating the viewed database 420, the control unit 41 selects rival users for each of the plurality of users who is learning with the plurality of electronic devices 2a, 2b, 2c . . . (Step S14). At Step S14, the control unit 41 designates, among the plurality of types of learner's content 212 stored in the viewed database 420, one or more types of learner's content 212 whose the viewing state is updated at Step S13 as the target content, and selects rivals user for each user. Referring to the flowchart of FIG. 18, the following describes the selection of rival users at Step S14 in details.

When the selection of rival users shown in FIG. 18 starts, the control unit 41 functions as the determination unit 470 and determines whether the updating of the viewing state for the target content is the second time or later or not (Step S101). More specifically when the degree of progress of the target content stored in the viewed database 420 is a value larger than 0 before the updating at Step S13, the control unit 41 determines that the updating is the second time or later. On the contrary, when the degree of progress of the target content is firstly updated to a value larger than 0 at Step S13, the control unit 41 determines that the updating is the first time.

When the determination shows that the updating of the target content is the first time (Step S101; NO), rival users of the target user for the target content has not yet been selected. In this case, the control unit 41 therefore functions as the selection unit 430 and newly selects rival users of the target user from a plurality of candidate users (Step S102). More specifically the control unit 41 selects, among the plurality of candidate users, one or more users having the number of times of viewing of the target content within a predetermined period of time that is a predetermined number or more and having a difference in degree of progress for the target content from the target user that is within a predetermined range as rival users.

Meanwhile, when the updating of the viewing state of the target content is the second time or later (Step S101; YES), the control unit 41 determines whether a change rate of the degree of progress for the target content decreases or not from the last time (Step S103). More specifically the control unit 41 determines whether the change rate of the degree of progress of the target content after the updating of the viewed database 420 at Step S13 increases or decreases from the change rate immediately before the updating.

When the change rate of the degree of progress of the target content decreases from the last time (Step S103; YES), the control unit 41 determines whether the degree of progress of the target content by the target user is at a higher rank among the rival users or not (Step S104). Specifically in the example of FIG. 13, the control unit 41 determines whether the ratio of the users having the degree of progress of the target content higher than that of user A among the four rival users P, Q, R and S is a predetermined ratio (e.g., 50%) or larger.

When the degree of progress of the target user is not at a higher rank among the rival users (Step S104; NO), the control unit 41 changes the rival users to users having a relatively low change rate of degree of progress (Step S105). More specifically the control unit 41 selects, among the plurality of candidate users, users having a change rate of the degree of progress for the target content that is a half or less of that of the target user as new rival users. Then the control unit 41 changes the rival users having the degree of progress higher than that of the target user to the newly selected rival users.

When the degree of progress of the target user is at a higher rank (Step S104; YES), the control unit 41 changes the rival users to users having a relatively high change rate of degree of progress (Step S106). More specifically the control unit 41 selects, among the plurality of candidate users, users having a change rate of the degree of progress for the target content that is twice or more of that of the target user as new rival users. Then the control unit 41 changes the rival users having the degree of progress lower than that of the target user to the newly selected rival users.

After selecting rival users at Step S102 or changing the rival users at Step S105 or Step S106, the control unit 41 updates the rival database 440 (Step S107). More specifically when selecting rival users at Step S102, the control unit 41 newly registers the user IDs, the nicknames, the degree of progress and the change rate of the selected rival users with the rival database 440 as the rival data for the target content of the target user. When changing rival users at Step S105 or Step S106, the control unit 41 changes the user IDs, the nicknames, the degree of progress and the change rate of the rival users that are stored in the rival database 440 before changing to the data of the new rival users.

When it is determined at Step S103 that the change rate of the degree of progress of the target content does not decrease from the last time, i.e., the change rate increases from the last time or does not change (Step S103; NO), this implies that the motivation for learning of the target user is not lowered. The control unit 41 therefore determines that the already selected rival users do not have to be changed. In this case, the control unit 41 skips Steps S104 to S107, and does not change the rival users. Then the selection of rival users shown in FIG. 18 ends.

Referring back to FIG. 17, after selecting rival users at Step S14, the control unit 41 waits for a request for rival information from any one of the plurality of communication terminals 3a, 3b, 3c . . . . During this time, the control unit 41 repeatedly executes the processing at Steps S13 and S14 every time viewed information 272 newly arrives from any one of the plurality of communication terminals 3a, 3b, 3c . . . at Step S12. More specifically the control unit 41 repeats the processing of updating the viewed database 420 with the newly received viewed information 272, and selecting rival users of the user whose viewing state is newly updated as the target user and for such learner's content 212 as the target content.

Meanwhile the control unit 31 in each of the plurality of communication terminals 3a, 3b, 3c . . . functions as the designation receiving unit 330 and determines whether designation of the target content to select rival users is received or not (Step S15). More specifically when the user wants to check the viewing state of rival users, the control unit starts a specific application program to designate the target learner's content 212 from a plurality of types of learner's content 212. In this way, the control unit 31 receives designation of the target content from the user.

When no designation of the target content is received (Step S15; NO), the control unit 31 waits for designation of target content at Step S15. During this time, every time new viewed information 272 arrives from any one of the plurality of electronic devices 2a, 2b, 2c . . . at Step S11, the control unit 31 repeatedly executes the processing at Step S12, i.e., the processing to transmit the newly acquired viewed information 272 to the server 4.

When designation of the target content is received (Step S15; YES), the control unit 31 functions as the request transmitting unit 340, and transmits a request for rival information to the server 4 via a wide area network (Step S16). That is, the control unit 31 requests information on the viewing state by rival users of the target content designated at Step S15 from the server 4. The control unit 41 of the server 4 functions as the request receiving unit 450. When receiving a request for rival information from each of the communication terminals 3a, 3b, 3c . . . , the request receiving unit 450 receives the transmitted request.

When receiving a request for rival information, the control unit 41 functions as the output information transmitting unit 460 and transmits the output information in accordance with the request to the communication terminal 3 that transmitted the request (Step S17). More specifically the control unit 41 refers to the rival database 440 to acquire information on the rival users of the user of the communication terminal 3 that transmitted the request. Then the control unit 41 transmits the output information indicating the degree of progress of the target content by the rival users and the output names of the rival users to the communication terminal 3 that transmitted the request. When the server 4 transmits the output information, then the control unit 31 in each of the plurality of communication terminals 3*a*, 3*b*, 3*c* . . . functions as the output information receiving unit 350 and receives the transmitted output information.

When receiving the output information, the control unit 31 functions as the output unit 360 and outputs the viewing state of the rival users that the received output information indicates (Step S18). Specifically as shown in FIGS. 12 and 15, the control unit 31 associates the degree of progress by the rival users that the received output information indicates with the output names of the respective rival users and displays the associated information on the display unit 34. This allows the user to easily know the state of learning by the rival users having the degree of progress close to that of the user, and so the user can improve their motivation for learning. Then the processing shown in FIG. 17 ends.

As stated above, the information processing system 1 according to Embodiment 1 selects rival users of the target user from a plurality of candidate users based on the viewing state of the learner's content 212 by the target user and the viewing states of the learner's content 212 by the plurality of candidate users, and outputs information indicating the viewing state of the learner's content 212 by the selected rival users. This allows the target user to easily know the degree of learning by other users, and can improve the motivation for learning by viewing the learner's content 212.

Especially the information processing system 1 according to Embodiment 1 automatically selects rival users suitable for the target user from a plurality of candidate users. This allows the target user, who is an adult or is learning at a remote location, for example, and so has little friends or acquaintances relating to the learning and has no rival users near themselves, to keep and improve the motivation for learning effectively.

Embodiment 2

The following describes Embodiment 2 of the present invention.

In the above Embodiment 1, before receiving a request for rival information from any one of the plurality of communication terminals 3*a*, 3*b*, 3*c* . . . at Step S14 in FIG. 17, the selection unit 430 of the server 4 designates the learner's content 212 that has been updated about the viewing state at Step S13 as the target content and execute the selection of rival users. In Embodiment 2, the selection unit 430 executes the selection of rival users after receiving a request for rival information from any one of the plurality of communication terminals 3*a*, 3*b*, 3*c* . . . .

Figure 19:
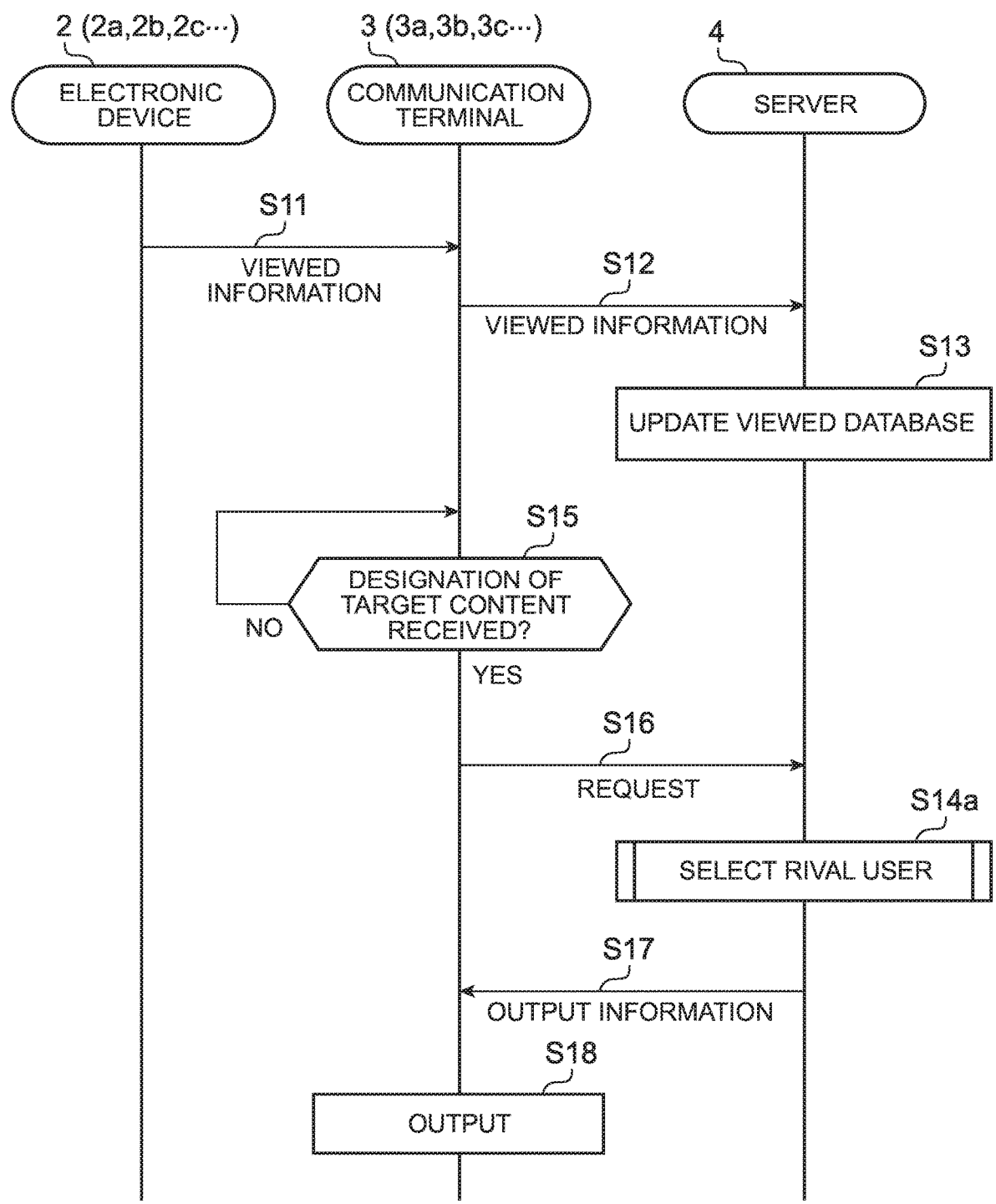
FIG. 19 shows a sequence for the processing flow executed by the information processing system of Embodiment 2 of the present invention.

FIG. 19 shows the flow of the processing executed by the information processing system 1 of Embodiment 2. Where FIG. 19 includes the steps with reference numbers that are the same as those shown in FIG. 17, the same processing as in Embodiment 1 is intended, and detailed descriptions thereof are omitted.

In Embodiment 2, the control unit 41 of the server 4 updates the viewed database 420 at Step S13, and stands by until it receives a request for rival information from any one of the plurality of viewed database 3*a*, 3*b*, 3*c* . . . at Step S16. When receiving a request for rival information, the control unit 41 functions as the selection unit 430, and executes the selection of rival users (Step S14*a*).

The selection of rival users at Step S14*a* is similar to that at Step S14 described in Embodiment 1. Note here that in Embodiment 1 (Step S14), the selection unit 430 executes the selection of rival users for each of a plurality of users as a target user, and in Embodiment 2 (Step S14*a*), the selection unit 430 designates the user of the communication terminal 3 that transmitted the request as the target user and the learner's content 212 designated by the request as the target content, and then executes the selection of rival users.

After that, at Step S17, the control unit 41 transmits output information obtained through the selection at Step S14*a* to the communication terminal 3 that transmitted the request. Receiving the output information from the server 4, at Step S18, the control unit 31 of the communication terminal 3 outputs the information on rival users that the received output information indicates.

In this way, the server 4 in Embodiment 2 receives a request for rival information from a communication terminal 3 and then executes the selection of rival users only for the target user and the target content in accordance with the request. This can reduce the load for the selection processing of rival users.

Embodiment 3

The following describes Embodiment 3 of the present invention.

In the above Embodiment 1, in response to the reception of a request for rival information from any one of the plurality of viewed database 3*a*, 3*b*, 3*c* . . . , the output information transmitting unit 460 of the server 4 transmits the corresponding output information to the communication terminal 3 that transmitted the request. On the contrary, the output information transmitting unit 460 of Embodiment 2 transmits the output information to a communication terminal 3 irrespective of whether or not the server receives a request for rival information from the communication terminal 3.

FIG. 20 shows the flow of the processing executed by the information processing system 1 of Embodiment 3. Where FIG. 20 includes the steps with reference numbers that are the same as those shown in FIG. 17, the same processing as in Embodiment 1 are intended, and detailed descriptions thereof are omitted.

In Embodiment 3, the control unit 41 of the server 4 executes the selection of rival users at Step S14, and then transmits the output information obtained through the selection of rival users to each of the plurality of communication terminals 3*a*, 3*b*, 3*c* . . . without waiting for reception of a request for rival information (Step S15*b*).

Receiving the output information from the server 4, the control unit 31 of each of the plurality of communication terminals 3*a*, 3*b*, 3*c* . . . stores the received output information in the storage unit 32 (Step S16*b*). After that, the control unit 31 determines whether designation of the target content is received from the user or not (Step S17*b*), and stands by until it receives the designation of the target content (Step S17*b*; NO). When receiving a designation of the target content from the user (Step S17*b*; YES), the control unit 31 specifies information on rival users about the designated target content from the output information stored in the storage unit 32 and outputs the same (Step S18*b*).

As stated above, the server 4 of Embodiment 3 transmits output information to each of the communication terminals 3 without waiting for a request from the communication terminal 3. Although this leads to an increase in the amount of data stored in each of the communication terminals 3, each communication terminal 3 can output rival information in accordance with an instruction quickly because there is no need to communicate with the server 4 again after receiving an instruction from the user to check the rival information.

MODIFIED EXAMPLES

That is the description of some embodiments of the present invention. These embodiments are just illustrative, and the scope of the present invention is not limited to those examples. That is, these embodiments of the present invention can be used in a variety of ways, and the scope of the present invention covers all of these embodiments.

For instance, the information processing system 1 in the above embodiments includes a plurality of electronic devices 2, a plurality of communication terminals 3 and a server 4. The configuration of the information processing system 1 of the present invention is not limited to this. For instance, any one of the plurality of communication terminals 3 may have the function of the server 4 in the above embodiments. That is, the communication terminal 3 may have the function as the selection unit 430 to select rival users based on the viewed information 272 acquired from each of the plurality of electronic devices 2, and the function as the output unit 360 to output information on the selected rival users. In this case, the server 4 can be omitted in the information processing system 1.

Alternatively each of the plurality of electronic devices 2 may have a function to directly communicate with the server 4, and the server 4 may have the function as the viewed information acquiring unit 310 to acquire the viewed information 272 from each of the plurality of electronic devices 2, the function as the selection unit 430 to select rival users based on the acquired viewed information 272, and the function as the output unit 360 to output information on the selected rival users to the electronic device 2 as the target. In this case, the communication terminals 3 can be omitted in the information processing system 1.

The information processing system 1 may include the electronic device 2 only. That is, the electronic device 2 may have the function of the selection unit 430 to select rival users from a plurality of candidate users based on the situation of executing the learner's content 212 so as to allow the target user to view the learner's content and the viewing state of the learner's content 212 by the plurality of candidate users, and the function as the output unit 360 to output information on the viewing state of the learner's content 212 by the selected rival users to the target user. In this way, the information processing system 1 according to the present invention can be implemented to have various configurations.

The above embodiments describe an example including an electronic dictionary as the electronic device 2. The electronic device 2 of the present invention is not limited to an electronic dictionary, which may be any device, including a personal computer, a smart phone or a mobile phone as long as it allows the user to view the learner's content 212. The learner's content 212 to be viewed may be outside of the electronic device 2, and the electronic device 2 may access the content via a wired or wireless communication.

The content to be viewed is not limited to the learner's content 212. For instance, the content to be viewed may be other types of content, such as the content of games or the content intended for dieting, as long as they allow the selection of rival users based on the viewing state, such as the degree of progress.

In the above embodiments, the selection unit 430 selects rival users of the target user as follows. That is, the selection unit selects, among the plurality of candidate users, users having the number of times of viewing of the target content that is a predetermined number or more within a predetermined period of time and having a difference in the degree of progress for the target content from the target user within a predetermined range. If no users meeting these conditions are available, the selection unit 430 may select virtual users instead of real users as the rival users. For instance, the selection unit 430 may configure, as the virtual user, a user having the degree of progress of the target content within a predetermined range relative to the degree of progress of the target user, and having the degree of progress that increases at a constant change rate.

In the above embodiments, the output unit 360 outputs the viewing state by rival users that the output information received from the server 4 indicates by displaying it on the display unit 34. Instead, the output unit 360 may output the viewing state in ways other than displaying, such as outputting the viewing state by rival users as audio output from a speaker.

In the above embodiments, the control units 21, 31 and 41 function as various units shown in FIG. 5 and FIG. 9 through execution of programs stored in the ROM by the CPU. In the present invention, the control units 21, 31, and 41 may have dedicated hardware, such as ASIC (Application Specific Integrated Circuit), FPGA (Field-Programmable Gate Array) and various control circuits, for example, instead of the CPU, and the dedicated hardware may function as various units shown in FIG. 5 and FIG. 9. In this case, each of the functions of these units may be implemented with individual pieces of hardware, or the functions of these units may be implemented collectively with a single piece of hardware. A part of the functions of these units may be implemented with dedicated hardware, and another part of the functions may be implemented with software or firmware. Each of the control units 21, 31 and 41 may be called a control means, or two or more of the control units 21, 31 and 41 may be collectively called a control means.

The present invention can provide an electronic device, a communication terminal and a server having the structure to implement the functions of the present invention beforehand, and also can apply a program to make the existing information processing device, for example, function as the electronic device, the communication terminal and the server of the present invention. That is, a program to implement the functions and configurations of the electronic device 2, the communication terminal 3 and the server 4 described as an example in the above embodiments may be applied so that the CPU, for example, to control the existing information processing device can execute the program. The existing information processing device thus can function as the electronic device, the communication terminal and the server according to the present invention.

Any application method of such a program may be used. For instance, such a program may be stored in a computer-readable storage medium, such as a flexible disk, a CD (Compact Disc)-ROM, a DVD (Digital Versatile Disc)-ROM, or a memory card for application. Such a program may be superimposed on carrier waves to apply the program via a communication medium, such as the internet. For instance, such a program may be posted on a BBS (Bulletin Board System) on a communication network for delivery. This program may be activated, and be executed similarly to other application programs under the control of the OS (Operating System) to execute the above-stated processing.

That is descriptions on preferable embodiments of the present invention. The present invention is not limited to these specific embodiments and includes the scope of claims below and the scope of their equivalents.

What is claimed is:

1. A server comprising:

a processor, a transmitter/receiver to communicate with a target communication terminal used by a target user and a plurality of other communication terminals used by a plurality of other users, respectively, and a storage storing instructions and a database, wherein the database stores user IDs of the target user and the plurality of other users in association with each piece of information of a viewing state of the corresponding user, each piece of information of the viewing state stored in the database including at least an index representing a degree of progress in viewing target content by that user, and a change rate in the degree of progress of that user, the change rate indicating the amount of progress the corresponding user has made in viewing the target content since a last update of the viewing state of that user;

wherein the processor executes the instructions to:

control the transmitter/receiver to receive information on the viewing state of the target user from the target communication terminal, and information on the viewing state of the plurality of other users from the plurality of other communication terminals, the information on the viewing state of the target user received from the target communication terminal including at least the degree of progress in viewing the target content by the target user, and the information on the viewing state of the plurality of other users received from the plurality of other communication terminals including at least the degree of progress in viewing the target content by the plurality of other users, respectively;

update the database in accordance with the received information on the viewing state of the target user and the received information on the viewing state of the plurality of other users, thereby updating the change rate of the target user and the change rate of the plurality of other users;

select a predetermined number of rival users for the target user from among the plurality of other users based on the updated change rate of the target user and the updated change rate of the plurality of other users; and control the transmitter/receiver of the server to transmit, to the target communication terminal, output information indicating the degree of progress of each of the selected predetermined number of rival users in the database and names of each of the selected predetermined number of rival users to cause the target communication terminal of the target user to display, on a display of the target communication terminal, the degree of progress of each of the selected rival users in association with their name, along with the degree of progress of the target user in a same display screen whereby the degree of progress of the target user and the degree of progress of each of the predetermined number of rival users can be visually compared, wherein:

the database includes a rival database, the rival database being updated in accordance with the selected rival users for the target user, the rival database storing an output name of each of the selected rival users in association with each piece of information of the viewing state of the corresponding selected rival user, each piece of information of the viewing state of the selected rival users including at least the index representing the degree of progress in viewing the target content by the corresponding selected rival user, and the change rate in the degree of progress of the corresponding selected rival user, the change rate indicating the amount of progress the corresponding rival user has made in viewing the target content since a last update of the viewing state of that rival user; and the processor executes the instructions to:

initially select, as the predetermined number of rival users, one or more first users from among the plurality of other users, the one or more first users having a difference in the degree of progress in viewing the target content from that of the target user that falls within a predetermined range, when the transmitter/receiver of the server newly receives the information on the viewing state of the target user from the target communication terminal, determine whether the change rate of the degree of progress of the target user has decreased, in a case in which the processor determines that the change rate of the target user has decreased, (i) newly select, as a new rival user, at least one second user from among the plurality of others users, the at least one second user being different from the initially selected one or more first users, (ii) replace at least one first user from among the one or more first users with the at least one second user, and (iii) update the rival database in accordance with the newly selected at least one second user replacing said at least one first user, wherein the processor selects the at least one second user and selects the at least one first user to be replaced by the at least one second user based on the change rate of the target user, the degree of progress of the at least one first user relative to the target user, and a change rate in the degree of progress of the at least one second user, the change rate in the degree of progress of the at least one second user indicating an amount of progress the at least one second user has made in viewing the target content since a last update of the viewing state of the at least one second user, whereby the rival database is dynamically updated in accordance with the most recently received information on the viewing state of the target user and the most recently received information on the viewing states of the plurality of other users;

in updating the rival database to reflect the selection of the at least one second user, replace the index representing the degree of progress and the change rate of the at least one first user with that of the at least one second user, but maintain the output name of the at least one first user replaced by the at least one second user such that the at least one second user is associated with the output name of the at least one first user whom the at least one second user has replaced; and control the transmitter/receiver of the server to newly transmit, to the target communication terminal, new output information including the output names of the selected predetermined number of rival users in the updated rival database and the degree of progress of each of the selected predetermined number of rival users in the updated rival database to cause the target communication terminal of the target user to display, on the display of the target communication terminal, the degree of progress of each of the selected rival users in association with their output name, along with the degree of progress of the target user in the same display screen, wherein the degree of progress of the at least one second user is displayed in association with the output name of the at least one first user who has been replaced by the at least one second user.

2. The server according to claim 1, wherein the processor further executes the instructions to select, as the predetermined number of rival users, users among the plurality of other users who viewed the target content a certain number of times or more during a certain period of time.

3. The server according to claim 1, wherein:
the one or more first users include a plurality of first users, and the processor further executes the instructions to:
after having initially selected the plurality of first users as the predetermined number of rival users, when the transmitter/receiver of the server newly receives the information on the viewing state of the target user from the target communication terminal and the processor determines that the change rate of the degree of progress of the target user has decreased,
(i) in a case where a ratio of users among the plurality of first users having a higher degree of progress than the target user to users among the plurality of first users having a lower degree of progress than the target user is greater than a predetermined ratio, select, as the at least one second user, a user from the plurality of other users whose change rate is smaller than the change rate of the target user, and
(ii) in a case where said ratio is less than the predetermined ratio, select, as the at least one second user, a user from the plurality of other users whose change rate is larger than the change rate of the target user.

4. The server according to claim 1, wherein
the content is for learning, and
the viewing state of each corresponding user includes a progress state of learning using the content by that user.

5. The server according to claim 1,
wherein the database includes a viewed database and the rival database,
wherein the viewed database stores the user IDs of the target user and each of the plurality of other users in association with the index representing the degree of progress in viewing the target content by the corresponding user;
wherein the rival database stores the user IDs and the output names of the target user and each of the predetermined number of rival users in association with each piece of information of the viewing state of the corresponding user, each piece of information of the viewing state including at least the index representing the degree of progress in viewing the target content by that user and the change rate in the degree of progress of that user;
wherein the processor executes the instructions to:
control the transmitter/receiver of the server to transmit, to the target communication terminal, the output information, the output information indicating the output names of the selected predetermined number of rival users in the rival database and the degree of progress of each of the selected predetermined number of rival users in the rival database, to cause the target communication terminal of the target user to display, on the display of the target communication terminal, the degree of progress of each of the selected rival users in association with their output name, along with the degree of progress of the target user in said same display screen whereby the degree of progress of the target user and the degree of progress of each of the predetermined number of rival users can be visually compared.

6. An information processing system comprising:
a target communication terminal used by a target user, the target communication terminal having a processor, a transmitter/receiver to communicate with a server, a display, and a storage;
a plurality of other communication terminals used by a plurality of other users, respectively, the plurality of other communication terminals each having a processor, a transmitter/receiver to communicate with the server, a display, and a storage; and
the server having a processor, a transmitter/receiver to communicate with the target communication terminal and the plurality of other communication terminals, and a storage storing a database,
wherein:
the database stores user IDs of the target user and the plurality of other users in association with each piece of information of a viewing state of the corresponding user, each piece of information of the viewing state stored in the database including at least an index representing a degree of progress in viewing target content by that user, and a change rate in the degree of progress of that user, the change rate indicating the amount of progress the corresponding user has made in viewing the target content since a last update of the viewing state of that user;
the processor of the target communication terminal is configured to:
control the transmitter/receiver thereof to transmit, to the server, information on the viewing state of the target user, the information on the viewing state of the target user including at least the degree of progress in viewing the target content by the target user;
the processor of each of the plurality of the other communication terminals is configured to:
control the transmitter/receiver thereof to transmit, to the server, information on the viewing state of the corresponding user among the plurality of other users, the information on the viewing state of the corresponding user among the plurality of other users including at least the degree of progress in viewing the target content by the corresponding user;
the processor of the server is configured to:
control the transmitter/receiver thereof to receive the information on the viewing state of the target user transmitted from the target communication terminal,
control the transmitter/receiver thereof to receive the information on the viewing state of the plurality of other users transmitted from the plurality of other communication terminals,
update the database in accordance with the received information on the viewing state of the target user and the received information on the viewing state of the plurality of other users, thereby updating the change rate of the target user and the change rate of the plurality of other users;
select a predetermined number of rival users for the target user from among the plurality of other users based on the updated change rate of the target user and the updated change rate of the plurality of other users, and
control the transmitter/receiver thereof to transmit, to the target communication terminal, output information indicating the degree of progress of each of the selected predetermined number of rival users in the database and names of each of the selected predetermined number of rival users; and the processor of the target communication terminal is configured further to:

control the transmitter/receiver thereof to receive, from the server, the output information, and control the display thereof to display, based on the received output information, the degree of progress of each of the selected rival users in association with their name, along with the degree of progress of the target user in a same display screen whereby the degree of progress of the target user and the degree of progress of each of the predetermined number of rival users can be visually compared, the database includes a rival database, the rival database being updated in accordance with the selected rival users for the target user, the rival database storing an output name of each of the selected rival users in association with each piece of information of the viewing state of the corresponding selected rival user, each piece of information of the viewing state of the selected rival users including at least the index representing the degree of progress in viewing the target content by the corresponding selected rival user, and the change rate in the degree of progress of the corresponding selected rival user, the change rate indicating the amount of progress the corresponding rival user has made in viewing the target content since a last update of the viewing state of that rival user;

the processor of the server is configured to:

initially select, as the predetermined number of rival users, one or more first users from among the plurality of other users, the one or more first users having a difference in the degree of progress in viewing the target content from that of the target user that falls within a predetermined range, when the transmitter/receiver of the server newly receives the information on the viewing state of the target user from the target communication terminal, determine whether the change rate of the degree of progress of the target user has decreased, in a case in which the processor of the server determines that the change rate of the target user has decreased, (i) newly select, as a new rival user, at least one second user from among the plurality of others users, the at least one second user being different from the initially selected one or more first users, (ii) replace at least one first user from among the one or more first users with the at least one second user, and (iii) update the rival database in accordance with the newly selected at least one second user replacing said at least one first user, wherein the processor of the server selects the at least one second user and selects the at least one first user to be replaced by the at least one second user based on the change rate of the target user, the degree of progress of the at least one first user relative to the target user, and a change rate in the degree of progress of the at least one second user, the change rate in the degree of progress of the at least one second user indicating an amount of progress the at least one second user has made in viewing the target content since a last update of the viewing state of the at least one second user, whereby the rival database is dynamically updated in accordance with the most recently received information on the viewing state of the target user and the most recently received information on the viewing states of the plurality of other users;

wherein, in updating the rival database to reflect the selection of the at least one second user, the processor of the server is configured to replace the index representing the degree of progress and the change rate of the at least one first user with that of the at least one second user, but maintain the output name of the at least one first user replaced by the at least one second user such that the at least one second user is associated with the output name of the at least one first user whom the at least one second user has replaced, wherein the processor of the server is configured to control the transmitter/receiver of the server to newly transmit, to the target communication terminal, new output information including the output names of the selected predetermined number of rival users in the updated rival database and the degree of progress of each of the selected predetermined number of rival users in the updated rival database, and wherein the processor of the target communication terminal of the target user is configured to control the display thereof to display the degree of progress of each of the selected rival users in association with their output name, along with the degree of progress of the target user in the same display screen, wherein the degree of progress of the at least one second user is displayed in association with the output name of the at least one first user who has been replaced by the at least one second user.

7. The information processing system according to claim 6, wherein the database includes a viewed database and the rival database, wherein the viewed database stores the user IDs of the target user and each of the plurality of other users in association with the index representing the degree of progress in viewing the target content by the corresponding user;

wherein the rival database stores the user IDs and the output names of the target user and each of the predetermined number of rival users in association with each piece of information of the viewing state of the corresponding user, each piece of information of the viewing state including at least the index representing the degree of progress in viewing the target content by that user and the change rate in the degree of progress of that user;

wherein the processor of the server is configured to:

control the transmitter/receiver of the server to transmit, to the target communication terminal, the output information, the output information indicating the output names of the selected predetermined number of rival users in the rival database and the degree of progress of each of the selected predetermined number of rival users in the rival database, to cause the target communication terminal of the target user to display, on the display of the target communication terminal, the degree of progress of each of the selected rival users in association with their output name, along with the degree of progress of the target user in said same display screen whereby the degree of progress of the target user and the degree of progress of each of the predetermined number of rival users can be visually compared.

8. An information processing method which is executed by a server having a processor, a transmitter/receiver to communicate with a target communication terminal used by a target user and a plurality of other communication terminals used by a plurality of other users, respectively, and a storage storing a database, wherein the method comprises:

storing, in the database, user IDs of the target user and the plurality of other users in association with each piece of information of a viewing state of the corresponding user, each piece of information of the viewing state stored in the database including at least an index representing a degree of progress in viewing target content by that user, and a change rate in the degree of progress of that user, the change rate indicating the amount of progress the corresponding user has made in viewing the target content since a last update of the viewing state of that user;

receiving, by the transmitter/receiver, from the target communication terminal, information on the viewing state of the target user, the information on the viewing state of the target user received from the target communication terminal including at least the degree of progress in viewing the target content by the target user;

receiving, by the transmitter/receiver, from the plurality of other communication terminals, information on the viewing state of the plurality of other users from the plurality of other communication terminals, the information on the viewing state of the plurality of other users received from the plurality of other communication terminals including at least the degree of progress in viewing the target content by the plurality of other users, respectively;

updating the database in accordance with the received information on the viewing state of the target user and the received information on the viewing state of the plurality of other users, thereby updating the change rate of the target user and the change rate of the plurality of other users;

selecting a predetermined number of rival users for the target user from among the plurality of other users based on the updated change rate of the target user and the updated change rate of the plurality of other users; and transmitting, by the transmitter/receiver of the server, output information indicating the degree of progress of each of the selected predetermined number of rival users in the database and names of each of the selected predetermined number of rival users to cause the target communication terminal of the target user to display, on a display of the target communication terminal, the degree of progress of each of the selected rival users in association with their name, along with the degree of progress of the target user in a same display screen whereby the degree of progress of the target user and the degree of progress of each of the predetermined number of rival users can be visually compared, wherein:

the database includes a rival database, the rival database being updated in accordance with the selected rival users for the target user, the rival database storing an output name of each of the selected rival users in association with each piece of information of the viewing state of the corresponding selected rival user, each piece of information of the viewing state of the selected rival users including at least the index representing the degree of progress in viewing the target content by the corresponding selected rival user, and the change rate in the degree of progress of the corresponding selected rival user, the change rate indicating the amount of progress the corresponding rival user has made in viewing the target content since a last update of the viewing state of that rival user; and the method further comprises:

initially selecting, as the predetermined number of rival users, one or more first users from among the plurality of other users, the one or more first users having a difference in the degree of progress in viewing the target content from that of the target user that falls within a predetermined range, when the transmitter/receiver of the server newly receives the information on the viewing state of the target user from the target communication terminal, determining whether the change rate of the degree of progress of the target user has decreased;

in a case in which it is determined that the change rate of the target user has decreased, (i) newly selecting, as a new rival user, at least one second user from among the plurality of others users, the at least one second user being different from the initially selected one or more first users, (ii) replacing at least one first user from among the one or more first users with the at least one second user, and (iii) updating the rival database in accordance with the newly selected at least one second user replacing said at least one first user, wherein the at least one second user and the at least one first user to be replaced by the at least one second user are selected based on the change rate of the target user, the degree of progress of the at least one first user relative to the target user, and a change rate in the degree of progress of the at least one second user, the change rate in the degree of progress of the at least one second user indicating an amount of progress the at least one second user has made in viewing the target content since a last update of the viewing state of the at least one second user, whereby the rival database is dynamically updated in accordance with the most recently received information on the viewing state of the target user and the most recently received information on the viewing states of the plurality of other users;

in updating the rival database to reflect the selection of the at least one second user, replacing the index representing the degree of progress and the change rate of the at least one first user with that of the at least one second user, but maintaining the output name of the at least one first user replaced by the at least one second user such that the at least one second user is associated with the output name of the at least one first user whom the at least one second user has replaced;

controlling the transmitter/receiver of the server to newly transmit, to the target communication terminal, new output information including the output names of the selected predetermined number of rival users in the updated rival database and the degree of progress of each of the selected predetermined number of rival users in the updated rival database to cause the target communication terminal of the target user to display, on the display of the target communication terminal, the degree of progress of each of the selected rival users in association with their output name, along with the degree of progress of the target user in the same display screen, wherein the degree of progress of the at least one second user is displayed in association with the output name of the at least one first user who has been replaced by the at least one second user.

9. The information processing method according to claim 8,
wherein the database includes a viewed database and the rival database,
wherein the viewed database stores the user IDs of the target user and each of the plurality of other users in association with the index representing the degree of progress in viewing the target content by the corresponding user;
wherein the rival database stores the user IDs and the output names of the target user and each of the predetermined number of rival users in association with each piece of information of the viewing state of the corresponding user, each piece of information of the viewing state including at least the index representing the degree of progress in viewing the target content by that user and the change rate in the degree of progress of that user;
wherein the method further comprises:
controlling the transmitter/receiver of the server to transmit, to the target communication terminal, the output information, the output information indicating the output names of the selected predetermined number of rival users in the rival database and the degree of progress of each of the selected predetermined number of rival users in the rival database, to cause the target communication terminal of the target user to display, on the display of the target communication terminal, the degree of progress of each of the selected rival users in association with their output name, along with the degree of progress of the target user in said same display screen whereby the degree of progress of the target user and the degree of progress of each of the predetermined number of rival users can be visually compared.

10. A non-transitory recording medium having a program recorded thereon that is executable by a computer of a server including (i) a transmitter/receiver for communicating with a target communication terminal used by a target user and a plurality of other communication terminals used by a plurality of other users, respectively, and (ii) a storage storing a database, the program being executable by the computer to control the computer to:
store, in the database, user IDs of the target user and the plurality of other users in association with each piece of information of a viewing state of the corresponding user, each piece of information of the viewing state stored in the database including at least an index representing a degree of progress in viewing target content by that user, and a change rate in the degree of progress of that user, the change rate indicating the amount of progress the corresponding user has made in viewing the target content since a last update of the viewing state of that user;
control the transmitter/receiver to receive information on the viewing state of the target user from the target communication terminal, and information on the viewing state of the plurality of other users from the plurality of other communication terminals, the information on the viewing state of the target user received from the target communication terminal including at least the degree of progress in viewing the target content by the target user, and the information on the viewing state of the plurality of other users received from the plurality of other communication terminals including at least the degree of progress in viewing the target content by the plurality of other users, respectively;
update the database in accordance with the received information on the viewing state of the target user and the received information on the viewing state of the plurality of other users, thereby updating the change rate of the target user and the change rate of the plurality of other users;
select a predetermined number of rival users for the target user from among the plurality of other users based on the updated change rate of the target user and the updated change rate of the plurality of other users; and
control the transmitter/receiver to transmit, to the target communication terminal, output information indicating the degree of progress of each of the selected predetermined number of rival users in the database and names of each of the selected predetermined number of rival users to cause the target communication terminal of the target user to display, on a display of the target communication terminal, the degree of progress of each of the selected rival users in association with their name, along with the degree of progress of the target user in a same display screen whereby the degree of progress of the target user and the degree of progress of each of the predetermined number of rival users can be visually compared,
wherein:
the database includes a rival database, the rival database being updated in accordance with the selected rival users for the target user, the rival database storing an output name of each of the selected rival users in association with each piece of information of the viewing state of the corresponding selected rival user, each piece of information of the viewing state of the selected rival users including at least the index representing the degree of progress in viewing the target content by the corresponding selected rival user, and the change rate in the degree of progress of the corresponding selected rival user, the change rate indicating the amount of progress the corresponding rival user has made in viewing the target content since a last update of the viewing state of that rival user; and
the program is executable by the computer to further control the computer to:
initially select, as the predetermined number of rival users, one or more first users from among the plurality of other users, the one or more first users having a difference in the degree of progress in viewing the target content from that of the target user that falls within a predetermined range,
when the transmitter/receiver of the server newly receives the information on the viewing state of the target user from the target communication terminal, determine whether the change rate of the degree of progress of the target user has decreased;
in a case in which it is determined that the change rate of the target user has decreased, (i) newly select, as a new rival user, at least one second user from among the plurality of others users, the at least one second user being different from the initially selected one or more first users, (ii) replace at least one first user from among the one or more first users with the at least one second user, and (iii) update the rival database in accordance with the newly selected at least one second user replacing said at least one first user, wherein the at least one second user and the at least one first user to be replaced by the at least one second user are selected based on the change rate of the target user, the degree of progress of the at least one first user relative to the target user, and a change rate in the degree of progress of the at least one second user, the change rate in the degree of progress of the at least one second user indicating an amount of progress the at least one second user has made in viewing the target content since a last update of the viewing state of the at least one second user, whereby the rival database is dynamically updated in accordance with the most recently received information on the viewing state of the target user and the most recently received information on the viewing states of the plurality of other users;

in updating the rival database to reflect the selection of the at least one second user, replace the index representing the degree of progress and the change rate of the at least one first user with that of the at least one second user, but maintaining the output name of the at least one first user replaced by the at least one second user such that the at least one second user is associated with the output name of the at least one first user whom the at least one second user has replaced;

control the transmitter/receiver of the server to newly transmit, to the target communication terminal, new output information including the output names of the selected predetermined number of rival users in the updated rival database and the degree of progress of each of the selected predetermined number of rival users in the updated rival database to cause the target communication terminal of the target user to display, on the display of the target communication terminal, the degree of progress of each of the selected rival users in association with their output name, along with the degree of progress of the target user in the same display screen, wherein the degree of progress of the at least one second user is displayed in association with the output name of the at least one first user who has been replaced by the at least one second user.

11. The non-transitory recording medium according to claim 10,
wherein the database includes a viewed database and the rival database,
wherein the viewed database stores the user IDs of the target user and each of the plurality of other users in association with the index representing the degree of progress in viewing the target content by the corresponding user;
wherein the rival database stores the user IDs and the output names of the target user and each of the predetermined number of rival users in association with each piece of information of the viewing state of the corresponding user, each piece of information of the viewing state including at least the index representing the degree of progress in viewing the target content by that user and the change rate in the degree of progress of that user;
wherein the program is executable by the computer to control the computer to:
control the transmitter/receiver of the server to transmit, to the target communication terminal, the output information, the output information indicating the output names of the selected predetermined number of rival users in the rival database and the degree of progress of each of the selected predetermined number of rival users in the rival database, to cause the target communication terminal of the target user to display, on the display of the target communication terminal, the degree of progress of each of the selected rival users in association with their output name, along with the degree of progress of the target user in said same display screen whereby the degree of progress of the target user and the degree of progress of each of the predetermined number of rival users can be visually compared.

12. A communication terminal of a target user, the communication terminal comprising:
a processor;
a transmitter/receiver to communicate with a plurality of other communication terminals used by a plurality of other users, respectively, or a server;
a display; and
a storage storing instructions and a database,
wherein the database stores user IDs of the target user and the plurality of other users in association with each piece of information of a viewing state of the corresponding user, each piece of information of the viewing state stored in the database including at least an index representing a degree of progress in viewing target content by that user, and a change rate in the degree of progress of that user, the change rate indicating the amount of progress the corresponding user has made in viewing the target content since a last update of the viewing state of that user;
wherein the processor executes the instructions to:
execute the target content designated by the target user so as to allow the target user to view the target content;
acquire information on the viewing state of the target user, the acquired information on the viewing state of the target user including at least the degree of progress in viewing the target content by the target user;
receive information on the viewing state of the plurality of other users from the plurality of other communication terminals or from the server, the information on the viewing state of the plurality of other users received from the plurality of other communication terminals or from the server including at least the degree of progress in viewing the target content by the plurality of other users, respectively;
update the database in accordance with the acquired information on the viewing state of the target user and the received information on the viewing state of the plurality of other users, thereby updating the change rate of the target user and the change rate of the plurality of other users;
select a predetermined number of rival users for the target user from among the plurality of other users based on the updated change rate of the target user and the updated change rate of the plurality of other users; and
control the display to display the degree of progress of each of the selected rival users in association with their name, along with the degree of progress of the target user in a same display screen whereby the degree of progress of the target user and the degree of progress of each of the predetermined number of rival users can be visually compared,
wherein:
the database includes a rival database, the rival database being updated in accordance with the selected rival users for the target user, the rival database storing an output name of each of the selected rival users in association with each piece of information of the viewing state of the corresponding selected rival user, each piece of information of the viewing state of the selected rival users including at least the index representing the degree of progress in viewing the target content by the corresponding selected rival user, and the change rate in the degree of progress of the corresponding selected rival user, the change rate indicating the amount of progress the corresponding rival user has made in viewing the target content since a last update of the viewing state of that rival user; and the processor executes the instructions to:

initially select, as the predetermined number of rival users, one or more first users from among the plurality of other users, the one or more first users having a difference in the degree of progress in viewing the target content from that of the target user that falls within a predetermined range;

when newly acquiring the information on the viewing state of the target user, determine whether the change rate of the degree of progress of the target user has decreased;

in a case in which the processor determines that the change rate of the target user has decreased, (i) newly select, as a new rival user, at least one second user from among the plurality of others users, the at least one second user being different from the initially selected one or more first users, (ii) replace at least one first user from among the one or more first users with the at least one second user, and (iii) update the rival database in accordance with the newly selected at least one second user replacing said at least one first user, wherein the processor selects the at least one second user and selects the at least one first user to be replaced by the at least one second user based on the change rate of the target user, the degree of progress of the at least one first user relative to the target user, and a change rate in the degree of progress of the at least one second user, the change rate in the degree of progress of the at least one second user indicating an amount of progress the at least one second user has made in viewing the target content since a last update of the viewing state of the at least one second user, whereby the rival database is dynamically updated in accordance with the most recently received information on the viewing state of the target user and the most recently received information on the viewing states of the plurality of other users;

in updating the rival database to reflect the selection of the at least one second user, replace the index representing the degree of progress and the change rate of the at least one first user with that of the at least one second user, but maintain the output name of the at least one first user replaced by the at least one second user such that the at least one second user is associated with the output name of the at least one first user whom the at least one second user has replaced; and display, on the display, the degree of progress of each of the selected rival users in association with their output name, along with the degree of progress of the target user in the same display screen, wherein the degree of progress of the at least one second user is displayed in association with the output name of the at least one first user who has been replaced by the at least one second user.

13. The communication terminal according to claim 12, wherein the database includes a viewed database and the rival database, wherein the viewed database stores the user IDs of the target user and each of the plurality of other users in association with the index representing the degree of progress in viewing the target content by the corresponding user;

wherein the rival database stores the user IDs and the output names of the target user and each of the predetermined number of rival users in association with each piece of information of the viewing state of the corresponding user, each piece of information of the viewing state including at least the index representing the degree of progress in viewing the target content by that user and the change rate in the degree of progress of that user;

wherein the processor executes the instructions to:

control the display to display the degree of progress of each of the selected rival users in association with their output name, along with the degree of progress of the target user in said same display screen whereby the degree of progress of the target user and the degree of progress of each of the predetermined number of rival users can be visually compared.

\* \* \* \* \*